US009135210B2

(12) United States Patent
Matsumoto et al.

(10) Patent No.: US 9,135,210 B2
(45) Date of Patent: Sep. 15, 2015

(54) PROCESSOR CORE AND MULTI-CORE PROCESSOR SYSTEM

(71) Applicant: TOPS Systems Corporation, Ibaraki (JP)

(72) Inventors: Yukoh Matsumoto, Ibaraki (JP); Hiroyuki Uchida, Ibaraki (JP)

(73) Assignee: TOPS SYSTEMS CORPORATION, Ibaraki (JP)

( * ) Notice: Subject to any disclaimer, the term of this patent is extended or adjusted under 35 U.S.C. 154(b) by 311 days.

(21) Appl. No.: 13/718,796

(22) Filed: Dec. 18, 2012

(65) Prior Publication Data

US 2014/0013021 A1    Jan. 9, 2014

(30) Foreign Application Priority Data

Jan. 27, 2012    (JP) ................... 2012-015988

(51) Int. Cl.
*G06F 13/24*    (2006.01)
*G06F 13/38*    (2006.01)
*G06F 15/167*    (2006.01)
*G06F 9/54*    (2006.01)

(52) U.S. Cl.
CPC ............. *G06F 15/167* (2013.01); *G06F 9/544* (2013.01); *G06F 13/24* (2013.01); *G06F 13/38* (2013.01)

(58) Field of Classification Search
CPC ....... G06F 13/24; G06F 13/38; G06F 15/167; G06F 9/544; G06F 5/44; G06F 15/16; G06F 15/144
See application file for complete search history.

(56) References Cited

U.S. PATENT DOCUMENTS

| | | | | |
|---|---|---|---|---|
| 5,841,988 | A * | 11/1998 | Chennubhotla et al. | 709/237 |
| 7,228,375 | B1 * | 6/2007 | Jacobson | 710/317 |
| 7,734,797 | B2 * | 6/2010 | Mueller | 709/229 |
| 8,095,816 | B1 * | 1/2012 | Chan et al. | 713/324 |
| 8,661,458 | B2 * | 2/2014 | Sakai | 719/321 |
| 2007/0273699 | A1 | 11/2007 | Sasaki et al. | |
| 2010/0287320 | A1 * | 11/2010 | Querol et al. | 710/260 |
| 2011/0179252 | A1 | 7/2011 | Master et al. | |
| 2013/0086286 | A1 * | 4/2013 | Tsadik et al. | 710/53 |

FOREIGN PATENT DOCUMENTS

| | | |
|---|---|---|
| JP | H06325565 A | 11/1994 |
| JP | 2007-316859 A | 12/2007 |
| JP | 2011-164525 A | 8/2011 |
| WO | 2011/148920 A1 | 12/2011 |

OTHER PUBLICATIONS

Office Action, mailed May 12, 2015, for JP Patent Application No. 2012-015988, 6 pages (translation provided).

* cited by examiner

*Primary Examiner* — Ryan Stiglic
*Assistant Examiner* — Christopher A Daley
(74) *Attorney, Agent, or Firm* — Seed IP Law Group PLLC

(57)    ABSTRACT

In one embodiment of the present invention, processor 1000 comprising a plurality of processor cores for processing an instruction-execution sequence is provided. Signal path 140 that is able to communicate an inter-core interrupt signal fint is connected to at least two processor cores 100A and 100B. Each core of the at least two cores has an inter-core interrupt count setting register (ICSR) 110 and a FIFO counter 120. Inter-core interrupt synchronization function, inter-core interrupt generation function, and FIFO counter updating function are implemented to the every core. In embodiments of the present invention, a core and a method therefor are also provided.

18 Claims, 8 Drawing Sheets

(a) ICSR

| 31 | 28 27 | 24 23 | 20 19 | 16 15 | 12 11 | 8 7 | 4 3 | 0 |
|---|---|---|---|---|---|---|---|---|
| F7 | FIFO7(2:0) | F6 FIFO6(2:0) | F5 FIFO5(2:0) | F4 FIFO4(2:0) | F3 FIFO3(2:0) | F2 FIFO2(2:0) | F1 FIFO1(2:0) | F0 FIFO0(2:0) |

(b) ICSR=00000000000000000000000010110010
   =000000B2(Hex)

(c) ICSR=00000000000000000000000011000000
   =00000C60(Hex)

*Fig. 4*

How to access FIFO in P0 running on Core0

```
<Initialization>
LRL R0, FIFO0_base_address    ; set Base Address for FIFO0
LRL R1, FIFO1_base_address    ; set Base Address for FIFO1
LRL R8,QFIFO01d3,iFIFO0d2     ; output FIFO1 (depth=3), input FIFO0(depth=2)
MT  ICSR, R8                  ; set FIFO depth in ICSR
<How to access FIFO>
  < Stream-In : Read from FIFO0 >
FISYNC0:FINT0:LDM D0x16, [R0]
  ;(FIFO0:ready;(FIFO0.CNT>0)) If FOINT0 has been received
  ; execute LDM
  ; issue FINT0 upon completion of LDM
  ;(FIFO0:empty;(FIFO0.CNT==0)) If FOINT0 has not been received
  ; wait until receiving FOINT0

ADD R0, FIFO0_size    ; updating pointer for FIFO0

<P0:Kernel>

< Stream-Out : Write to FIFO1 >
FOWAIT1:FINT1:STM [R1], D16x16
  ; If FIFO1 counter is on upper limit
  ;    wait until receiving FINT1
  ; If FIFO1 counter is not upper limit
  ;    execute STM
  ;    issue FINT1 upon completion of STM(FOINT1)
```

How to access FIFO in P1 running on Core1

```
<Initialization>
LRL R1, FIFO1_base_address    ; set Base Address for FIFO1
LRL R2, FIFO2_base_address    ; set Base Address for FIFO2
LRL R8,QFIFO2d4,iFIFO0d3      ; output FIFO2 (depth=4), input FIFO1(depth=3)
MT  ICSR, R8                  ; set FIFO1 depth in ICSR
<How to access FIFO>
  < Stream-In : Read from FIFO1>
FISYNC1:FINT1:LDM D0x16, [R1]
  ;(FIFO1:ready;(FIFO1.CNT>0)) If FOINT1 has been received
  ; execute LDM
  ; issue FINT1 upon completion of LDM (FOINT1), FIFO1.CNT--
  ;(FIFO1:empty;(FIFO1.CNT==0)) If FOINT1 has not been received
  ; wait until receiving FOINT1

ADD R1, FIFO1_size    ; updating pointer for FIFO1

<P1:Kernel>

< Stream-Put : Write to FIFO2 >
FOWAIT2:FINT2:STM [R2], D7x16
  ;(FIFO2:full;(FIFO2.CNT==4)) If FIFO2 counter is on upper limit
  ;    wait until receiving FINT2
  ;(FIFO2:notfull;(FIFO2.CNT<3)) If FIFO2 counter is not upper limit
  ;    execute STM
  ;    issue FINT2 upon completion of STM (FOINT2)
```

*Fig. 6*

Figure 7
(a)
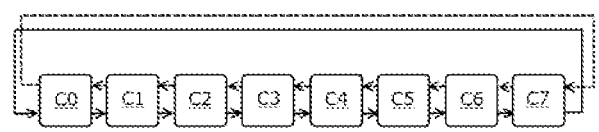
(b)
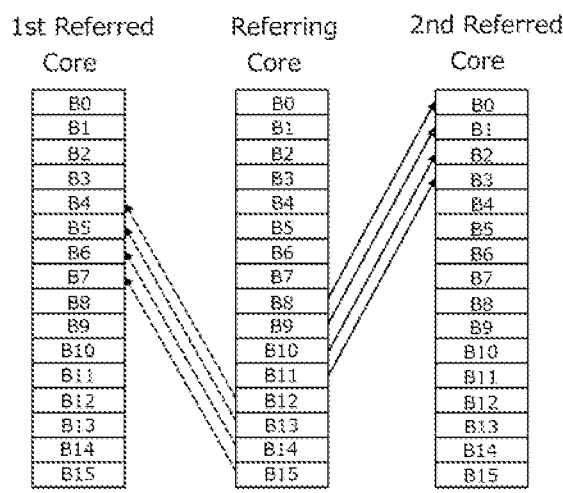

How to access FIFO in P0 running on Core0

```
<Initialization>
; Local Variables
; 1st entry of FIFO1
; 2nd entry of FIFO1
; 3rd entry of FIFO1
LRL R0, FIFO0_base_address    ; set Base Address of FIFO0
LRL R8, OFIFO1H3_IFIFO0H3_IFIFO2_tH  ; output FIFO1(depth=3), input FIFO0(depth=2)
MT  ICSR, R8                  ; set FIFO1 depth in ICSR
<How to access FIFO>
< Stream-In : Read from FIFO0>
FISYNC0:FINT0:LDM D0+16, [R0]
  ; (FIFO0:ready; (FIFO0.CNT>0)) If FOINT0 has been received
  ;    execute LDM
  ; issue FINT0 upon completion of LDM (FIINT0; FIFO0.CNT--
  ; (FIFO0:empty;(FIFO.CNT==0)) If FIFO0 has not been received
  ;    wait until receiving FOINT0

ADD R8, FIFO0_size   ; updating pointers for FIFO0

<P0:Kernel>
FOWAIT1:xx
  ; (FIFO1:full;(FIFO1.CNT=3)) If FIFO1 counter is on upper limit
  ;    wait until receiving FINT1
  ; (FIFO1:not_full;(FIFO1.CNT<3)) If FIFO1 counter is not upper limit
  ;    execute code below
BS10: ; Destination Bank = B1
  ; Operations (results are stored in Destination Bank)
FINT1:
  ; issue FINT1 (FOINT1)
  <Stream-Out: Write to FIFO1>
  ; none BS20: ; updating destination of FIFO1
```

How to access FIFO in P1 running on Core1

```
<Initialization>
; Local Variables
; 1st entry of FIFO1 (B0 of Core0)
; 2nd entry of FIFO1 (B1 of Core0)
; 3rd entry of FIFO1 (B2 of Core0)
LRL R2, FIFO2_base_address    ; set Base Address of FIFO2
LRL R8, OFIFO2H4_IFIFO3        ; output FIFO2(depth=4), input FIFO1(depth=3)
MT  ICSR, R8                  ; set FIFO1 depth in ICSR
<How to access FIFO>
<Stream-In : Read from FIFO1>
FISYNC1:xx
  ; (FIFO1:ready; (FIFO1.CNT>0)) If FOINT1 has been received
  ;    execution
  ;    issue FINT1 upon completion
  ; (FIFO1:empty;(FIFO1.CNT==0)) If FOINT1 has not been received
  ;    wait until receiving FOINT1

BS01: ; Source Bank = B1
  ; ...     ; operation (on input=Source Bank)
FINT1:xx    ; Completion of source bank access (issue FOINT1)

BS02: ; Source Bank = B2
  ; updating read out source of FIFO1
<Stream-Out : Write to FIFO2>
FOWAIT2:FINT2:STM [R2], D7+16
  ; (FIFO2:full;(FIFO2.CNT=4)) If FIFO2 is on upper limit
  ;    wait until receiving FINT2
  ; (FIFO2:not_full;(FIFO2.CNT<3)) If FIFO2 is not on upper limit
  ;    execute STM
  ;    issue FINT2 upon completion of STM (FOINT2)

ADD R2, FIFO2_size  ; updating pointers for FIFO2
```

Fig. 8

PROCESSOR CORE AND MULTI-CORE PROCESSOR SYSTEM

CROSS REFERENCE TO RELATED APPLICATIONS

This application claims the benefit of Japanese Patent Application No. 2012-015988 filed on Jan. 27, 2012 before the Japan Patent Office, which is hereby incorporated by reference in its entirety.

BACKGROUND OF THE INVENTION

1. Field of the Invention

The present invention is related to hardware structure of processor core as well as multi-core processor, and a method for processing software on such a multi-core processor.

2. Description of the Related Art

For information systems, such as computers and embedded systems, processors including microprocessors, DSPs, micro controllers and so forth continues to improve its performance by, for example, increasing operating clock frequency, density of transistors in line with advancement of semiconductor technologies. Especially, for increasing functionality and processing efficiency, processor cores tend to increase their circuit scale by integrating more transistors into a chip, or a single piece of semiconductor die.

On the other hand, recently other approaches are chosen to improve computing performance than implementing a large scale circuitry into a single piece of the die. One approach is to increase the number of processor cores on a single die for executing parallel processing, or to combine different types of processor cores having respective operation purposes on a single chip. This is because performance improvement will become marginal even when a complexity due to the number of transistors is increased. For example, doubling the die size merely increases the performance only by the square root of two, or about 1.4, as known as Pollack's Law. It results in disadvantages as increase in power consumption as well as generation of heat caused by a more number of transistors, rather than the improvement of a processor core performance therefrom. A processor integrating multiple processor cores is sometimes called a multi-core processor, or a many-core processor.

In technology trends in this field, the multiple processor core approach has been common these days especially in application processors. For example, in application fields such as mobile devices and high performance computing whose performance per power is crucial, multi-core processor has been one of typical approaches. A pre-grant Japanese patent publication, JP 2007-316859 A, which corresponds to a pre-grant US patent publication No. 2007/0,273,699, discloses a computer architecture having multi-core processor. In addition, a concept of GPGPU, General Purpose computations on Graphics Processing unit, is also attracting a great deal of attention. It is because such a concept can provide a general-purpose computation with utilizing highly parallel processing by adopting integer operations and conditional branches instructions on a GPU, Graphics Processing Unit. Generally, these multi-core processors integrating processor cores are made in two styles: in one style called a homogeneous multi-core, identical type of processor cores are integrated, whereas in the other style called a heterogeneous multi-core, different types of processor cores are integrated.

SUMMARY OF THE INVENTION

It is known that there is a multi-core processor that uses a buffer, such as a first-in first-out buffer, or a FIFO buffer, for inter-process communications as means for communication between processes running on the multi-core processor. For example, Kahn Process Network, which uses a FIFO buffer on each inter-process communication channel, is known as a system model that improves efficiency of distributed processing on a multi-core processor system. The FIFO buffer is, for example, used to carry over a sequence of process from a processor core to another processor core by providing access from two processor cores amongst at least two processor cores. For example, a pre-grant Japanese patent publication, JP 2011-164525 A, discloses means for transferring multimedia data on a multi-core processor using a FIFO buffer.

However, in conventional multi-core processor architectures, the inter-process communications via a FIFO buffer produces a big overhead during carry over of a process through the FIFO buffer. More specifically, processing of API, Application Programming Interface, for example, for using the FIFO buffer requires a large number of instructions for its operation, including acquisition of FIFO entry status, FIFO status management, or the like. Moreover, for synchronization of FIFO buffer accesses from multiple processor cores, one for write access, and another for read access, a large number of instructions for implementing exclusive access control by such as semaphore are required. Since the above overhead regarding execution of APIs for accessing FIFO buffer corresponds to a number of instructions typically from 200 to 300 instructions, conventional FIFO buffer implementation requires a period of from 200 to 300 clock cycles for each FIFO buffer access. The exclusive access control by semaphore also requires call for semaphore functions and operations such as so-called P operation and V operation. Therefore, the processing capability of hardware with multi-core processor is not always fully performed even when conventional FIFO buffer approach is adopted.

From software point of view, software implementation of synchronization regarding inter-process communications is a burden when a system that includes inter-process communications is practiced.

From the foregoing, the present invention is devised to solve at least one or more issues described above. In particular, the present invention reduces overhead during execution of inter-process communications through a buffer, such as the FIFO buffer, on multi-core processor system having multiple processor cores. The present invention contributes a high performance multi-core processor system having multi-core processors, by enabling energy-efficient computation with substantially increased processing speed of processes with inter-process communications, or by increasing efficiency for executing software that distributes its processes over the processor cores.

After the study on the above issues, the inventors of the present invention found a processor architecture for multi-core processors that reduces overhead regarding inter-process communications when a FIFO buffer is adopted for the inter-process communications. The present invention provides hardware structure of a processor core and a multi-core processor, and a method for processing software runs of such hardware.

According to one aspect of the present invention, a processor comprising a plurality of processor cores for processing a sequence of instruction-execution processes is provided. The sequence includes inter-process communications (IPCs). The processor also comprises a signal path that is connected to at least two processor cores of the plurality of processor cores. The signal path is able to communicate an inter-core interrupt signal fint. In the processor, every processor core of the at least two processor cores has an inter-core interrupt count setting register (ICSR) and a FIFO counter. The ICSR is a register for storing a FIFO depth value, where the FIFO depth value indicates a number of entries in a first-in first-out (FIFO) buffer that is used for IPCs between a process in a present processor core and a process in a different processor core. The ICSR also sets an upper limit for a range in the instruction-execution sequence, where the range includes the IPCs under execution. On the other hand, the FIFO counter is a counter for storing a value for indicating a number of entries currently used in the FIFO buffer. In the processor, three functions are implemented in a operable manner to every processor core of the at least two processor cores. The functions are: inter-core interrupt synchronization function, inter-core interrupt generation function, and FIFO counter updating function. The inter-core interrupt synchronization function is a function that carries out IPCs between a present processor core and a different processor core. The inter-core interrupt synchronization function does so, based on at least any of: an inter-core interrupt signal fint received from the different processor core of the at least two processor cores, a value in the FIFO counter, and a value in the ICSR. The inter-core interrupt generation function is a function that issues and sends an inter-core interrupt signal fint, when the present processor core completes accessing the FIFO buffer. The inter-core interrupt signal fint is to be used by the different processor core for controlling its processes. And the FIFO counter updating function is a function that increments or decrements a value in the FIFO counter in accordance with a reception of the inter-core interrupt signal fint or with an issuance of an inter-core interrupt signal fint by the present processor core. As such, the processor of the aspect of the present invention synchronizes processes on the at least two processor cores for executing the instruction-execution sequence including the IPCs via the FIFO buffer.

According to another aspect of the present invention, a processor core with the above described features in the processor core is provided, with which a processor having a plurality of processor cores with the features is used for execution of process with inter-process communications.

According to yet another aspect of the present invention, a method for operating a processor having a plurality of processor cores for executing a sequence of instruction-execution processes including inter-process communications (IPCs) is provided. The method of this aspect is implemented to the processor having at least two processor cores in the plurality of processor cores, where every processor core of the at least two processor cores has the identical feature of the processor core described above. The method comprises steps that are practiced by functional means implemented in every processor core. That is, the method comprises inter-core interrupt synchronization step, inter-core interrupt generation step, and FIFO counter updating step. In the inter-core interrupt synchronization step, the processor carries out IPCs between a present processor core and a different processor core in the at least two processor cores based on at least any of: inter-core interrupt signal fint received from the different processor core, a value in the FIFO counter, and a value in the ICSR. In the inter-core interrupt generation step, the processor issues and sends an inter-core interrupt signal fint when the present processor core completes accessing the FIFO buffer, the inter-core interrupt signal fint being to be used by the different processor core for controlling its processes. And in the FIFO counter updating step, the processor increments or decrements a value in the FIFO counter in accordance with a reception of the inter-core interrupt signal fint or with an issuance of an inter-core interrupt signal fint by the present processor core. From this aspect of the present invention, the instruction-execution sequence including the IPCs via the FIFO buffer is executed with synchronization of processes on the at least two processor cores.

According to the above aspects of the present invention, overhead on processes with inter-process communications when operating a processor having a plurality of processor cores is reduced, whereby processors with high performance that are suitable for executing software using FIFO buffer for inter-process communications will be realized.

Through the Specification of the present Application, a processor having a plurality of processor cores includes any sort of hardware that executes a sequence of information processing by using the plurality of processor cores in the processor. A typical implementation of such a processor is what is fabricated on a single piece of semiconductor die to include multiple processor cores. However, it is to be noted that, a processor of the present invention can be practiced as a processor having a plurality of processor cores that are fabricated on a plurality piece of semiconductor die in order for the processor to provide a sequence of information process by cooperation of the plurality of processor cores. In addition, the processor having a plurality of processor cores provides memory access functionality to the plurality of processor cores, where the functionality is required for executing each computations in parallel as much as possible.

Furthermore, through the Specification of the present Application, a processor core has at least one instruction control mechanism, such as a decoder, an instruction execution unit and so on and includes hardware for functional units that can operate independently. Therefore, typically, each processor core executes computation according to an instruction set for realizing objective functions through the instruction control mechanism on it. However, the processor core in the present invention may include a processor core that executes computation under control of an instruction control mechanism placed outside of the processor core, and a processor core that executes a process that is distinct from one in the other processor cores.

Furthermore, through the Specification of the present Application, a sequence of instruction execution process means a set of processes. Where, such processes are executed in each processor core of the plurality of processor cores, which processes correspond to at least an instruction that executed on each processor core. Such an instruction may include a general instruction as ADD and SUB, and it includes atomic operations. In addition, the process is executed in a sequential manner using states of a program counter in each processor core. Therefore, such a sequence of instruction execution process may be executed by one processor core up to a certain step of a set of processes, and thereafter a part or all of the rest of steps are executed by another processor core. In order to appropriately process the sequence of instruction execution process, an inter-process communication through FIFO buffer is used.

In the Specification of the present Application, a FIFO buffer is, typically, any type of first-in first-out buffer that is used for inter-process communications, or IPCs, implemented on any hardware or on memory apparatus by software. Such a FIFO buffer of this Application may include a buffer on a memory apparatus that has multiple entries to allow accessed in a first-in first-out manner from multiple processor cores by using any or all of entries, or a multi-entry FIFO buffer. However, a FIFO buffer of this Application may be memory with a single entry that can be a buffer used temporarily, or a single-entry FIFO buffer, so long as it can be accessed from multiple processor cores. A typical multi-entry FIFO buffer may realize a first-in first-out operation by storing in order of first in, and out to, with ordered entries in a memory area, where the multiple memory segments in the memory area are distinct from each other. Hardware to implement such a FIFO buffer includes 1) shared register bank fabricated on a semiconductor die on which a processor core is made, 2) on-chip memory that is memory included in a same package, or a chip, into which the semiconductor die is encapsulated, and 3) memory in another chip other than a chip that includes a processor core. Such an on-chip memory includes an on-die memory in a same die that having a processor core, or off-die memory that is encapsulated in a same package, but made in separate die from that of the processor core. The FIFO buffers of these types are addressable 1) through any bus with address, 2) as an operand in an instruction if it is in register, or 3) by instructions from at least two processor cores by means of, for example, bank switching in order to prevent long instruction length. As such, FIFO buffers of this Application provide processor cores with function of a buffer to temporarily store elements for IPCs with keeping access order.

In the Specification of the present Application, a function is "implemented" may mean that the function is substantially provided by a functional unit that is formed as hardware. For example, an instruction control mechanism is implemented so as to include logic circuit elements that can execute an objective function by organizing the logic circuit as a hardwired method. In addition, a decoder is organized so as to output micro-code that provide the objective function by ALU, or Arithmetic Logic Unit, in the instruction control mechanism by using registers, by giving instructions that provides objective function, for example by software described by using assembly language. Such a structure is an example of the typical implementation.

In a most typical processor that embodies the present invention, each processor core executes instructions on each register in each processor core, by using each memory, according to each program by each instruction execution function. Then, it carries over a sequence of instruction process between at least two of processor cores using a memory that can be accessible from the processor cores, or a register shared by both processor cores, as a FIFO buffer. One of the processor cores executes a part of a sequence of instruction execution process, then the rest part of the sequence is taken over and executed by another processor core by receiving information from the FIFO buffer. Both of processor cores are organized as described above with regard to functions or processing steps for such carry over.

With an aspect of the present invention, it enables cooperative processing by a plurality of processor cores with reducing overhead of inter-process communications, and it provide hardware structure of a processor core with improved processing efficiency, and of a multi-core processor, as well as a method for operating software executed on it.

BRIEF DESCRIPTION OF THE DRAWINGS

FIG. 4 is a diagram showing a typical structure of ICSR in each processor core in a processor in an embodiment of the present invention.

FIG. 6 is an example set of program lists showing a case in which a FIFO buffer is implemented on RAM, or random access memory, in a processor in an embodiment of the present invention.

FIG. 7 is a diagram showing typical structure to implement a FIFO buffer using shared register bank within a processor with an aspect of the present invention.

FIG. 8 is an example set of program lists when a FIFO buffer is implemented using a shared register bank in a processor in a processor in an embodiment of the present invention.

DETAILED DESCRIPTION

An embodiment of the present invention will now be described below with reference to the accompanying drawings.

1 Structure

Figure 1:
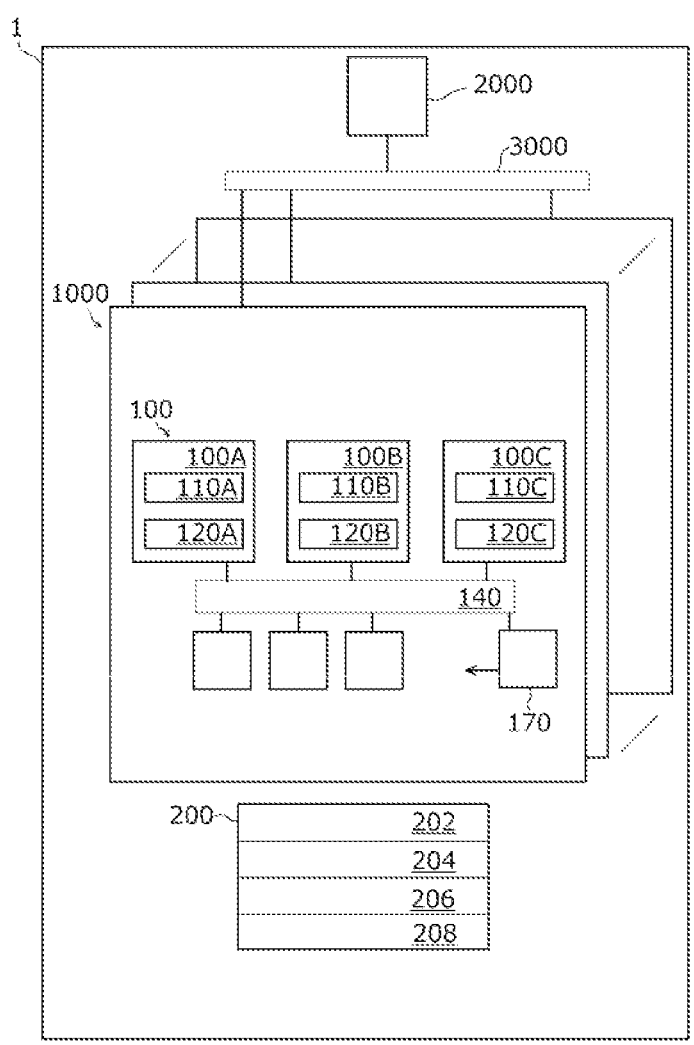
FIG. 1 is a block diagram showing structure of a computer system including an example processor structure described as an embodiment of the present invention.

An embodiment of a processor structure having multiple processor cores will be described with reference to figures. FIG. 1 is a block diagram that illustrates overview of computer 1 having an example of a processor 1000. Computer 1 has a central processing unit, or CPU 2000, which is able to communicate with processor 1000 through a suitable bus, bus 3000. Processor 1000 is connected to computer 1, for example, together with multiple processors that have the same structure as processor 100s0. In this configuration, processor 1000 operates in cooperation with CPU 2000. However, this is not the only usage of processor 1000. For example, there could be a case of processor 1000 in that only a single processor may be included, or processor 1000 may be included in computer 1 excluding CPU 2000. In addition, the processor of this embodiment can be applied to any electronic devices or appliances.

Processor 1000 has a plurality of processor cores 100 for executing a sequence of instruction execution processes, where the sequence includes inter-process communications. A set of processor cores 100 may be one of homogeneous cores, or of heterogeneous cores. Here, processor cores 100A and 100B are described as ones of at least two of processor cores amongst processor cores 100. A typical processor 1000 is configured on a single semiconductor die having all of processor cores 100 on it. However, it is not necessary to integrate all of processor core 100 on a single die for practicing an aspect of the present invention.

1-1 Overview of Processor Structure

Of the plurality of processor cores, at least two processor cores 100A and 100B are interconnected by signal path 140, such that one or more inter-core interrupt signals fint may be communicated between them. FIFO buffer 200, which is accessible by both processor cores 100A and 100B, is used for the inter-process communications. The FIFO buffer 200 may be composed of a register or a memory and may reside on the same chip as processor 1000 or a different one. Another example of FIFO buffer 200 is a register on a chip on which processor cores 100A and 100B are fabricated. FIG. 1 illustrates a functional block of FIFO buffer 200 to illustrate a structure for both cases.

1-2 Overview of FIFO Operation

An embodiment of a processor 1000 executes a sequence of instruction execution process by cooperating at least two processor cores 100A and 100B, and carry out inter-process communications. In order to realize IPCs (inter-process communications) between separate processor cores, FIFO buffer 200 is used. The operation of a sequence of instruction execution process on processor cores 100A and 100B can be separated into four steps. As 1st step, processor core 100A executes the sequence of instruction execution process up to a certain stage, such that a part of process of the set of sequence of instruction execution processes is processed by processor core 100A. As 2nd step, processor core 100A stores a state or a result of execution in the sequence of instruction execution process as an element of data to FIFO buffer 200. As 3rd step, processor core 100B reads out the element for passing over the state or the result of the execution by accessing FIFO buffer 200. Thereafter as 4th step, processor core 100B receives the element, uses the state or the result of execution to be resumed as an initial condition, and then executes the process. FIFO buffer 200 then executes in a first-in first-out operation in case it is a FIFO buffer with multiple entries. By using a multiple entry FIFO buffer, such an operation allows unevenness of execution time and load imbalance between processes in the above-mentioned 1st and 2nd steps executed on processor core 100A, and the 3rd and 4th steps executed on processor core 100B. In addition, based on the first-in first-out operation of FIFO buffer 200, the execution order of a sequence of instruction execution processes including IPCs is guaranteed. Typical IPCs by way of FIFO buffer 200 may be readily understood with more detailed example, which follows. In the 1st step Processor 100A executes a first sequence of instructions, which yield, for example, an interim result. In the 2nd step, assuming FIFO buffer 200 is not yet full, processor 100A places the interim result into FIFO buffer 200. In the 3rd step, upon "seeing" that FIFO buffer 200 is not empty, processor 100B retrieves the interim result from FIFO buffer 200. Then in the 4th step, Processor 100B executes a second sequence of instructions starting with the interim result, for completing the first and the second sequences. This will yield, for example, a final result. It is to be noted that the above examples are described for the FIFO buffer operation in general, thus the FIFO buffer operation in the embodiment of the present invention may be practiced in different implementation.

1-3 Structure of Processor Core

The above description about IPCs using FIFO buffer 200 illustrates a typical processing using FIFO buffers. In an embodiment of a processor 1000, process execution is not stopped as much as possible during IPCs using FIFO buffer 200, due to means of processor core 100A and 100B. In addition, in processor 1000, there is no increase of instruction steps for sending and receiving data through FIFO buffer. In this regard, at least two processor cores 100A and 100B that execute inter-process communications, may have registers, inter-core interrupt count setting register (ICSR) 110 and FIFO counter register 120. In the following description, in order to distinguish items in processor core 100A from processor core 100B, postfix A or B is added for respective items, and in order to commonly describe items for both cores such a postfix will be omitted. This is also applied for explanations for the processor cores themselves.

1-3-1 Inter-Core Interrupt Count Setting Register (ICSR)

Inter-core interrupt count setting register (Interrupt Count Setting Register, or ICSR) 110 is a register to store the depth of FIFO buffer. Where, the depth of FIFO represents the number of FIFO buffer 200 entries that is used for carrying over processes between a process executed by one processing core and a process executed by another processor core. For example, when FIFO depth is denoted as "4" or any value that corresponds thereto, FIFO buffer 200 can temporary store elements for process execution, by using four entries, such as 1st entry 202, 2nd entry 204, 3rd entry 206, and 4th entry 208. The FIFO depth in this embodiment is variable and can be specified in a program, such as specifying a value to be stored in ICSR 110 in the program. Thus, the capability of adjusting it to an appropriate number of entries for cooperation of processor cores 100A and 100B is preferable when implementing an aspect for processing inter-process communications. The ICSR 110 is typically fixed during execution of a range of a sequence of instruction execution process, but it may be set again to another value upon transition to another process as necessary. This means that, ICSR 110 typically indicates an upper limit of the number of entries of FIFO buffer 200 during the range of the sequence of instruction execution process that includes IPCs in progress. However, since the FIFO depth is variable, it can be dynamically adjusted during process execution so as to reduce imbalance of workloads between processes, in light of allocating limited resources such as a memory area and registers. This is described more specifically in "1-9 Dynamic Adjustment of the number of FIFO entries."

As described above, FIFO buffer 200 is used through the above four steps for IPCs that realize cooperative processing with processor cores 100A and 100B. Thus, based on a point view of input and output between processes, FIFO buffer 200 is regarded as an "output FIFO buffer" for processor core 100A, as well as an "input FIFO buffer" for processor core 100B. This is described more specifically in "1-5-1 Logical Distinction between FIFO Buffer and Processor Core."

1-3-2 FIFO Counter

FIFO counter 120 in each processor core 100 in an embodiment of a processor 1000 is a count register storing the number of entries in progress for FIFO buffer 200. The number of entries indicated by FIFO counter 120 should be 0 or larger, and less than or equal to the upper limit indicated by ICSR 110 that stores the number of entries in use for FIFO buffer 200. Especially, in the case FIFO counter 120 indicates "0", processor core 100 can recognize that the number of entries used by FIFO buffer 200 is 0, that is, the FIFO buffer 200 is empty. Likewise, when FIFO counter 120 indicates the same value as one indicated by ICSR 110, processor core 100 can recognize that the number of entries used in FIFO buffer 200 reaches the upper limit, that is, the FIFO buffer 200 is full.

In other words, ICSR 110 in an embodiment of the present invention may be implemented as a "programmable" "per core" register that indicates the number of entries currently allowed in FIFO buffer 200. Thus, ICSR 110 as the register may indicates the maximum number of the entries in FIFO 200 for the core is able to store elements. Moreover, the value in the ICSR 110 may be changed by software at any time. In a typical manner of operation, however, the value in the ICSR 110 would be changed only when processes are switched. It is to be noted, as for FIFO counter 120, each core may also have a current read/write pointer that acts as FIFO 120, in addition to ICSR 110 or the corresponding registers.

It is to be noted that in the example operation described above, processor core 100A outputs to FIFO buffer 200 and processor core 100B inputs (reads) from FIFO buffer 200. Both processor cores 100A and 100B have the ability to read and write their respective ICSRs and to change the value of their register 120s.

1-4 Function of Processor Cores

A amongst functions executed by the at least two processor cores 100A and 100B that use ICSR 110 and FIFO counter 120 described above, we describes below inter-core interrupt synchronization function, inter-core interrupt generation function, and FIFO counter update function, all of which are closely related to FIFO buffer 200. Processor cores 100A and 100B are implemented so as to be able to execute each function by representing them in a program. In addition, it is to be noted that processor cores 100A and 100B may have arithmetic operation functions for executing processes, though they are not described here.

1-4-1 Overview of Inter-core Interrupt Synchronization Function

The inter-core interrupt synchronization function in processor core 100A relevant to a FIFO buffer 200 is, plainly speaking, a function to synchronize each process to be executed on each processor core. In inter-core interrupt synchronization function, each process forms a sequence of instruction execution process between the processor core and another processor core, such as processor cores 100A and 100B. The inter-core interrupt synchronization function operates based on at least any of inter-core interrupt signal fint, a value in the FIFO counter, and a value in the ICSR. The inter-core interrupt signal fint received from another processor core 100B of the at least two processor cores 100A and 100B. Here, to denote inter-core interrupt signal fint and inter-core interrupt synchronization, they include an expression of "interrupt." The interrupt in the context of inter-core interrupt described in this embodiment may differ from a typical interrupt, in that the interrupt of this embodiment merely notifies an event, and in that the processor that has received the interrupt does not execute the interrupt processing routine. Thus, the interrupt of this embodiment is different from an interrupt, in a general sense, to CPU 2000 of computer 1, an interrupt to processor 1000 from CPU 2000, an interrupt to processor 1000 between processor 1000, or the like. The values in the FIFO counter and ICSR in this embodiment are used together with inter-core interrupt signal fint for the purpose of processing IPCs by cooperating processor cores 100A and 100B through FIFO buffer 200. Simply put, values in the FIFO counter and the ICSR are used to determine whether the processor core, for example processor core 100A, should be in wait state or continue execution when FIFO buffer 200 is empty or full state. Also, the inter-core interrupt signal fint is used to control execution of such a sequence of instruction execution process by issuing and transferring the signal, and receiving the signal for an interrupt between processor cores for controlling each processor core's execution. In a typical implementation, the inter-core interrupt signal fint in this embodiment is used firstly for resuming from wait state upon empty or full status of FIFO buffer 200, and used secondary for updating FIFO counter on processor core 100A when inter-core interrupt signal fint is received from another processor core, for example processor core 100B.

Thus, how the FIFO buffer, the signal fint and the ICSR interrelate may be described as follows. The signal fint sent from the sending processor core, processor core 100A, does not cause a "classic interrupt" in that the receiving processor core, processor core 100B, does not change its context or execute an interrupt service routine; instead, the signal fint can be considered as a "wake up" signal if the receiving processor core, processor core 100B, is waiting with its empty FIFO buffer, or on FIFO-empty status. Alternatively if the sending processor 100A is waiting with full FIFO buffer, or on FIFO-full status, then the signal fint from the receiving processor core (100B) will "wake it up," as the FIFO buffer 200 is no longer full. So if the value in ICSR 110A equals the value in current pointer 120A, then the FIFO 200 is full and processor core 100A must wait for it to go not-full status before doing another write. Likewise, if the value in current pointer 120B equals 0, then the FIFO 200 is empty and processor core 100B must wait for it to go not-empty status before doing another read. The signal fint also acts as a control signal that causes a processor core that receives the signal fint to either increment (processor core 100A, the writer) or decrement (processor core 100B, the reader) its current pointer 120A or 120B. It is to be noted that this approach is simplex, that is, for communication from processor core 100A to processor core 100B is realized in one FIFO/fint set, and on from processor core 100B to processor core 100A is realized in another FIFO/fint set.

To synchronize processes that form a sequence of instruction processes between one processor core, for example processor core 100A, and another processor core, for example processor core 100B, may mean to carry over the sequence of instruction execution processes that is executed up to a certain stage, by keeping the execution order of processes in each processor core so as to execute each sequence of instruction execution processes as programmed by cooperating the processor core with another processor core. In this embodiment, the order of carried over elements is guaranteed by the first-in first-out operation on FIFO buffer 200. Then, in order to reduce the overhead on using FIFO buffer 200, any of inter-core interrupt signal fint, the value in FIFO counter, and the value in ICSR is used. As this result, synchronization of each process that forms a sequence of instruction execution process is performed with reducing the overhead as much as possible. With this synchronization, a sequence of instruction execution processes can be distributed over processor cores and executed properly.

In this regard, however, processor core 100 has a typical interrupt function in addition to the inter-core interrupt, as same as conventional processor core, for example, it can receive interrupt from CPU 2000. Therefore, the interrupt processing supporting inter-core interrupt signal fint can also be provided as an extension of the above-mentioned typical interrupt function. Moreover, the inter-core interrupt synchronization function can also be a synchronization step of an inter-core interrupt, when it is considered as a method of operation of processor 1000.

1-4-2 Overview of Inter-Core Interrupt Generation Function

Another function of processor core 100A relevant to FIFO buffer 200 is inter-core interrupt generation function and is simply to issue inter-core interrupt signal fint and transfer the signal for controlling a sequence of instruction execution processes on processor core 100B by another processor core 100B upon completion of access to FIFO buffer 200 for execution of process corresponding to a single entry in FIFO buffer 200 by the processor core 100A. This will be described based on a case, in which the inter-core interrupt signal fint is sent out from processor core 100A and is received by processor core 100B. If FIFO buffer 200 is in empty state, which results in processor core 100B should be in wait state, then upon receipt of inter-core interrupt signal fint, processor core 100B is released from wait state and resumes its execution. In another word, inter-core interrupt signal fint is a signal to notify that each processor core, for example processor core 100A, has completed the process corresponding to one entry of FIFO, or write, to another processor core in cooperation, for example, processor core 100B. Also, "interrupt" here represents an inter-core interrupt for processing inter-core communications properly. In addition, the access completion to FIFO buffer 200 that is indicated by inter-core interrupt signal fint includes operations such as read from or write to the FIFO buffer 200, as an example. Also, the inter-core interrupt generation function can be an inter-core interrupt generation step, when it is a method for operating processor 1000.

The above-described inter-core interrupt generation function in processor core 100 in this embodiment is executed upon completion of the FIFO access for an instruction execution process, by prefixing FINT, a prefix to generate interrupt, to the instruction. That is, upon access to FIFO buffer 200 for such an instruction with a prefix FINT for interrupt generation, processor core 100 notifies processor inter-core interrupt signal fint to a processor in cooperation through FIFO buffer 200. The prefix for interrupt generation is decoded together with the instruction itself, and the interrupt signal generation is carried out during the execution of instruction that follows the FINT prefix. Therefore, each processor core 100 does not consume any cycles for notifying the event to a processor in cooperation.

This operation will be understood by more specific example. The inter-core interrupt signal fint is generated by adding a FINT instruction prefix to an existing processor core instruction. So let us consider processor core 100A executes a normal operation, as "Store R0, [FIFO buffer 200]" instruction, which stores the contents of general register 0 into the memory location of FIFO buffer 200. Here, square brackets above denote corresponding target address of FIFO buffer 200. If instead of such a normal operation processor core 100A executes an operation with the interrupt generation, as "FINT::Store R0, [FIFO buffer 200]," this prefixed instruction now causes a signal, inter-core interrupt signal fint, to be sent from processor core 100A to processor core 100B, as well as the same operation as the normal operation. Importantly, having a prefix FINT allows us to "hide" the time required for the signal from processor 100A to affect processor 100B "behind" normal instruction stream processing. As a result, the inter-process interrupt is executed as if there is effectively no overhead.

The above inter-core interrupt generation function is, not only supported in typical conventional processors, but also it functions very effectively to synchronize the executions of multiple processor cores. For example, let us assume that the buffer that has been described as FIFO in the above is a single entry FIFO. Even in this case, multiple processor cores having the inter-core interrupt generation function can synchronize their executions. From this point of view, FIFO buffer 200 in this embodiment is not limited to a multi-entry buffer operated in first-in first-out manner with the multiple entries, but it substantially includes a buffer with a single entry, which would be implemented by a true single register or a multi-entry FIFO with ICSR set to 1.

1-4-3 Overview of FIFO Counter Update Function

Next we describe the FIFO counter update function. This function is, simply put, a function to increment (count up) or decrement (count down) a value in the FIFO counter in accordingly with receipt of inter-core interrupt signal fint, or issuance of inter-core interrupt signal fint by the processor core. Thus, the value of FIFO counter 120 reflects the number of entries in use in FIFO buffer 200.

The inter-core synchronization function, inter-core interrupt generation function, and FIFO counter update function will be described in detail in "1-5 Operation of Carry Over through FIFO" along with the specific structure of FIFO buffer 200. Also, inter-core interrupt signal fint is described in detail in "1-8 Structure of Inter-core Interrupt Signal fint."

1-5 Operation of Carry Over Through FIFO

In the operation of carry over through FIFO buffer, its implementation manner and its execution timing are controlled by program. Therefore, firstly we describe concept of an operation of FIFO buffer and processor core in connection with the carry over operation (in 1-5-1), describe its operation style (in 1-5-2), then describe necessary structure of the processor core for its operation by contrasting upstream processor core with downstream processor core (in 1-5-3, and 1-5-4).

1-5-1 Logical Distinction Between FIFO Buffer and Processor Core

From a processor core's standpoint an operation of FIFO buffer 200 for a certain range of its process can be considered as an input FIFO or an output FIFO. On the other hand, from a FIFO's standpoint, each processor core is considered as an upstream processor core that outputs element to FIFO for inter-process communications, or a downstream processor core that receives such elements from the FIFO. Such expressions as "input" and "output," and "upstream" and "downstream" are meant to indicate the direction of carrying over operation of elements for inter-process communications. In the embodiment of processor 1000, the direction of carrying over can be changed at any time by a control from program. That is, in one direction as illustrated in FIG. 1, processor core 100A acts as an upstream processor core and outputs element to FIFO buffer 200, which operates as an output FIFO buffer, whereas in tat direction processor core 100B acts as a downstream processor core and receives the element in FIFO buffer 200, which operates as an input FIFO buffer. The direction can be reversed.

More specifically, as long as the direction is kept unchanged, the inter-processor communications (IPCs) operate in a simplex (one directional) manner. In contrast, when the direction is reversed as stated above, that is, if bi-directional carry over is necessary, one is used in a direction from processor core 100A to processor core 100B and the other in the opposite direction, we may need two different sets of FIFO buffer and the signal fint. In this bi-directional implementation, one direction uses processor core 100A as the writer and processor core 100B as the reader; while the other direction uses processor core 100A as the reader and processor core 100B as the writer.

Here, in order to describe the concept of this embodiment of the present invention more explicitly, we tentatively leave the specific structure illustrated in FIG. 1, and instead describe its process and processor cores based on a scheme that fixes the direction of carry over, with generalizations of the hardware structure and its relation depicted in FIG. 1. Note that such an explanation does not lose any generality of the concept, and for explanation purposes the relationships to the specific hardware structure in FIG. 1 will be described where necessary.

Figure 2:
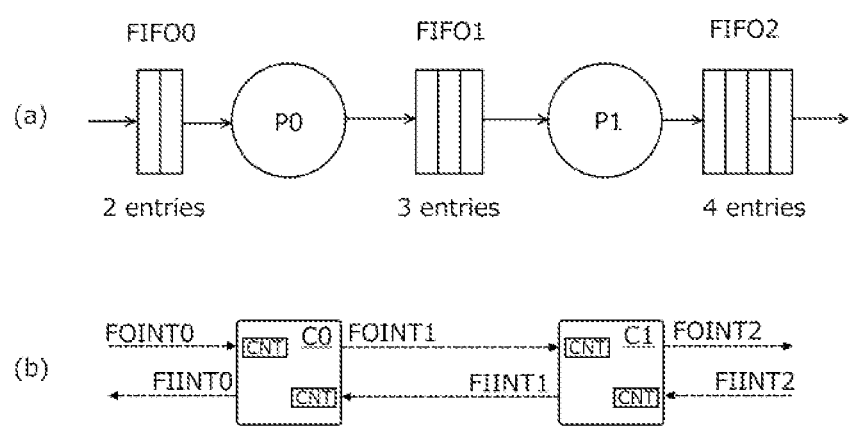
FIG. 2 is a schematic diagram showing inter-process communications with an inter-core interrupt between an upstream processor core and a downstream processor core in a processor in an embodiment of the present invention.

An example for IPCs and an inter-core interrupt is described below based on upstream processor core C0, which will be abbreviated hereinafter as "upstream core C0," and downstream processor core C1, or "downstream core C1," in FIG. 2. FIG. 2(*a*) illustrates software structure. That is, FIG. 2(*a*) depicts a structure in that the kernel process P0 runs on upstream core C0 and the kernel process P1 runs on downstream core C1, and that the input and output relationship of elements that carried over between these processor cores by IPCs though FIFO0, FIFO1, and FIFO2. FIFO0, FIFO1, and FIFO2 are illustrated as FIFO buffer having 2, 3, and 4 entries respectively.

The relationship of the IPCs and FIFO buffers in the example of the present invention may be better understood by slightly different explanation. In a software structure of the system as shown in FIG. 2(*a*), data feeds into process P0 through IPC using FIFO0 buffer, then Process P0 feeds its output to process P1 through IPC via FIFO1 buffer, and lastly process P1 feeds its output to another process through IPC via FIFO2 buffer. It is to be noted in this example that three FIFO buffers of different sizes are used.

As illustrated here, elements for IPCs are typically carried over from upstream core c0 to downstream core C1, such as left to right on the figure. In addition, processes P0 and P1 are executed in this order. In FIG. 2(b) the relationship of interrupt between processor cores, upstream core C0 and downstream core C1, through inter-core interrupt signal fint is illustrated. The inter-core interrupt signal fint is classified into two: an inbound inter-core interrupt signal fiint and an outbound inter-core interrupt signal foint. In this Specification we explicitly indicate a target of inbound inter-core interrupt signal fiint and outbound inter-core interrupt signal foint, when such distinction is necessary, by adding suffix to these signal names, especially with respect to FIFO0, FIFO1, and FIFO2 buffers. For example, the inbound inter-core interrupt signal fiint for FIFO0 buffer is represented as FIINT0. In FIG. 2(b), all of inbound inter-core interrupt signals fiint are illustrated as arrows in dotted line from the right to the left, and vise versa for outbound inter-core interrupt signal foint. The signals, such as inbound inter-core interrupt signal fiint and outbound inter-core interrupt signal foint illustrated here are mere examples of this embodiment.

In particular, FIG. 2(b) shows the hardware control view of FIG. 2(a). Thus, the FIFO buffers themselves may be regarded as data path than control structure, which may include other signal paths that are not shown in FIG. 2. For this example, inbound inter-core interrupt signals fiint are specified as FIINTn for inter-core interrupt signal fint signal going from a FIFO reader to its writer, where the FIFO0's reader, or upstream processor core C0 in the FIG. 2, sends FIINT0 buffer to the writer of FIFO0, which is not shown in FIG. 2, and the writer of FIFO0 buffer sends FOINT0 to the reader, processor core C0. In FIG. 2(b) each signal in addition to its name has an arrow pointing to the receiver of the signal.

The relationship between FIGS. 1 and 2 is described as follows in a manner that can be embodied as a practical program. In one possible relationship, processor core 100A in FIG. 1 corresponds to upstream core C0 in FIG. 2, and processor core 100B corresponds to downstream core C1. Also, FIFO buffer 200 can be organized by applying a memory, such as a RAM, or shared register bank so as to separate each other logically among FIFO0, FIFO1, and FIFO2 buffers in FIG. 2. FIFO buffer 200 also can be organized to separate FIFO buffers for duplex operation as necessity. As an example, all FIFO buffers from FIFO0 through FIFO2 can be located on a memory. Another example is that at least one of FIFO from FIFO0 through FIFO2, for example only FIFO1 can be located on a shared register bank and FIFO0 and FIFO2 can be located on memory. In addition, any of inter-core interrupt signal fint may be communicated through signal path 140 in FIG. 1. Signal path 140 is illustrated as a signal path between processor cores, but inter-core interrupt signal fint can be sent and received between certain processor cores through any signal path as interrupt signals attributed to difference processor cores that is not shown in the figure. In this regard, the signal path that can transfer inter-core interrupt signal fint in this embodiment is not limited to an internal signal path in a processor.

1-5-2 Style of Inter-Process Communications

Figure 3:
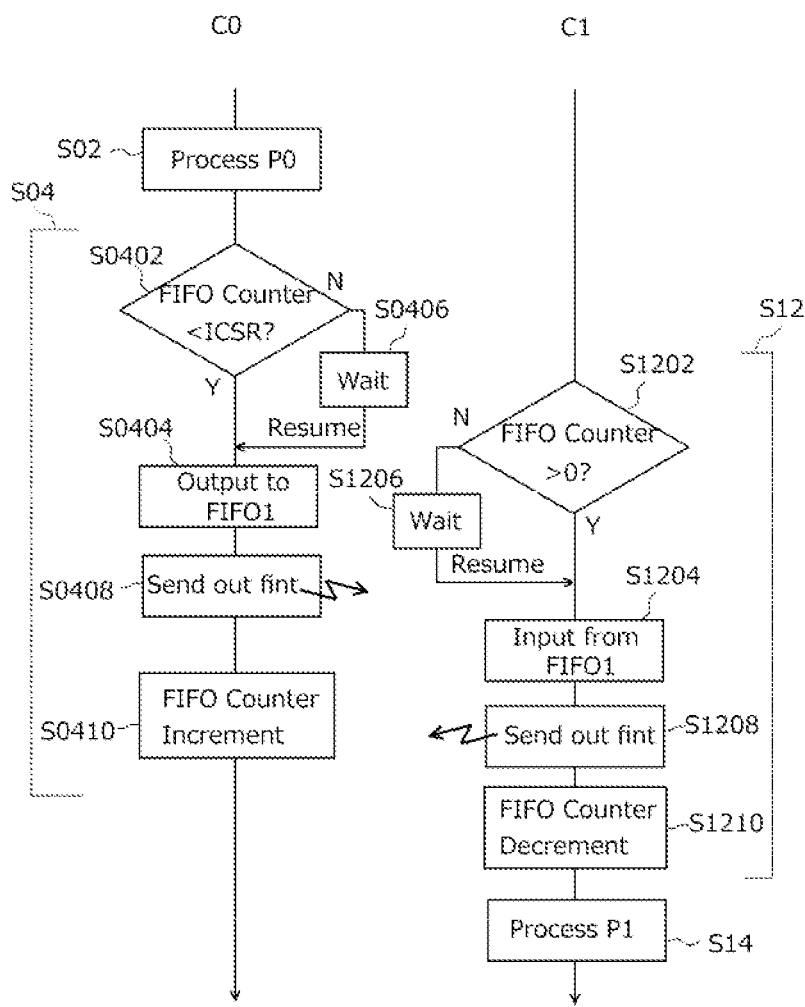
FIG. 3 is a flow chart showing an operation behavior of carry over element through a FIFO buffer from an upstream processor core to a downstream processor core in a processor with an embodiment of the present invention.

The operation for carrying over elements for IPCs (inter-process communications) from upstream core C0 to downstream core C1 through FIFO1 is described by referencing FIG. 3. Here, as an example, we assume that FIFO buffers are organized on a memory. FIG. 3 is a flow chart that illustrates the operation for carrying over elements for IPCs from upstream core C0 to downstream core C1.

At first, upstream core C0 executes process P0 as its own process (S0). In order for this upstream core C0 pre-load data from an entry in FIFO0 to appropriate data register in itself that is used as input data for the process P0. Then, P0 is executed on the input data in the data register. The process P0 is a process of a program including at least one execution in itself. Then upon completion of, or about to completion of process P0, output process (S04) that output data to FIFO0 from upstream core C0 is executed. Typical output data is a value in data register that stored during the execution of process. In this embodiment, we call this output data process by upstream core C0 as "stream-out." The purpose of stream-out process is to write out element that is an outcome of process P0 into FIFO1. However, in case that all entries of FIFO1 are occupied (full), the processor core trying to send out the element need to wait while keeping the element.

More specifically, process P0 on upstream core C0 reads its next data value from FIFO0, then after processing the data value, the upstream core C0 writes its result into FIFO1 and continues with the next value from FIFO0. If FIFO1 is full when the write is attempted, upstream core C0 waits till the FIFO1 goes "Not Full." In addition, if FIFO0 is empty when upstream core C0 attempts to read the next data item, it will again wait till there is data in the FIFO (i.e. FIFO "Not empty")

In order for this operation, upstream core C0 executes a comparison between FIFO counter CNT and ICSR with respect to FIFO1 (S0402). For example, if the upstream core C0 is core 100A in FIG. 1, it compares a value for FIFO1 in FIFO counter 120A and a corresponding value in ICSR 110A. As the result, if FIFO1 is not full, output process to FIFO1 is executed (S0404), whereas if FIFO1 is full it becomes wait state (S0406). The wait state is released upon receipt of inter-core interrupt signal fint from downstream core C0, then the process to output element to FIFO1 is executed (S0404). This is because the reception of inter-core interrupt signal fint from downstream core C1 directly means that a vacant entry has been generated after the use of elements in FIFO1 by downstream core C1. Then, upon completion of FIFO1 access to output element to FIFO1, upstream core C0 issues inter-core interrupt signal fint, or outbound inter-core interrupt signal foint, to downstream core C1 (S0408). Then, the FIFO counter CNT for FIFO1 is incremented (S0410). By this, stream-out is completed. Here, the upstream core C0 is always monitoring inter-core interrupt signal fint (or inbound inter-core interrupt signal fiint) from the downstream core C1, upon receipt the signal fint from the downstream core C1, the upstream core C0 executes an updating process of FIFO counter CNT value for FIFO1. In addition, FIFO counter CNT is typically implemented as a hardware, and updating of FIFO count CNT is executed by hardware.

In this regard, how to determine FIFO Full or Empty conditions is described by way of an example. When the process running on upstream core C0 (P100A in FIG. 1) attempts to write a new data value to the process running on downstream core C1 (P100B in FIG. 1), the following sequence occurs. Upstream core C0 checks to see if the value of the FIFO1 counter (part of 120A in FIG. 1) equals the ICSR (part of 110A in FIG. 1) for FIFO1 (see FIG. 2(a)). If they are equal then FIFO1 is full, upstream core C0 enters a wait; some time later downstream core C1 reads the next data value from FIFO1 and uses the FINT instruction prefix to tell the downstream core C1 to send an inter-core interrupt signal fint to upstream core C0 to indicate that an entry in FIFO1 has been used. Upon receipt of this inter-core interrupt signal fint, upstream core C0 leaves "wait" and continues to the next step. Then upstream core C0 writes the new data value into FIFO1 again sending to downstream core C1 another signal fint to indicate the FIFO has a new entry. This causes the FIFO1 counter (part of 120B in FIG. 1) to be incremented. Before trying to read the next data value from FIFO1, downstream core C1 checks to see if the value of the FIFO1 counter (part of 120B in FIG. 1) equals zero (see FIG. 2(*a*)), if it is then the FIFO is empty and downstream core C1 needs to wait for the FIFO to go not empty. If downstream core C1 was waiting on FIFO empty, the signal fint indicates a new data value is present in the FIFO and downstream core C1 should leave the wait state. Downstream core C1 reads the new data value from the FIFO1 and executes an instruction with an FINT prefix for signaling core C0 that downstream core C1 has taken an entry from FIFO1. Note the signal fint in this case causes the FIFO1 counters for both C0 and C1 to decrement. Typically the updating of the FIFO counters is carried out in hardware, triggered by the signal fint; however it is possible to have the update done by software as well.

On the other hand, elements resulting from processing of process P0 by the upstream processing core C0 are inputted to the downstream core C1 through FIFO1 (S12). A process to receive a result of upstream process will be called as "stream-in" in this Specification. Since stream-in to downstream core C1 cannot be executed when FIFO1 is empty, it is executed only when FIFO1 is not empty (S12). In order to check to see if FIFO1 is empty, downstream core C1 uses FIFO counter CNT for FIFO1. For example, the value in the FIFO counter is compared with a value that indicates that FIFO1 is empty, such as "0" (S1202).

When FIFO1 is not empty, such as the value in the FIFO counter is positive, downstream core C1 reads out an element from FIFO1 (S1204), whereas when FIFO1 is empty downstream core C1 goes to wait state (S1206). This wait state is release by the inter-core interrupt signal fint from upstream core C0, then downstream core C1 reads in the element (S1204). This is because receiving inter-core interrupt signal fint from the upstream processor core means that the upstream core C0 outputs an element to FIFO1, and that the element to be used can be receivable from FIFO1. Upon completion of access to FIFO1 through an input process (S1204) from FIFO1, downstream core C1 send out inter-core interrupt signal fint to the upstream core C0 (S1208). Then, FIFO counter is decremented (S1210). By this process, stream-in is completed. Then, the downstream core C1 handles an element as an input for its process P1. In most typical case, the element is stored in data registers that are used by downstream core C1. Thereafter, downstream core C1 executes process P1 (S14). It should be noted that downstream core C1 also keep monitoring inter-core interrupt signal fint from upstream core C0, and upon receipt of the signal fint from upstream core C0 downstream core C1 executes updating of FIFO counter value for FIFO1.

In the process described here, the execution of each process on upstream core C0 and the downstream core C1 can be independent from each other when the FIFO status is appropriate for execution. However, when the FIFO status is not appropriate wait status is selected for two processor cores to synchronize with each other through FIFO1 status. Therefore, the wait status is selected in the case that FIFO1 is full in which the upstream core C0 goes into wait state (S0406), since it cannot write out any element to FIFO1, and in the case that FIFO1 is empty in which the downstream core C1 goes into wait state (S1206), since it cannot read out any element from FIFO1. Then, during the wait state, inter-core interrupt signal fint is monitored, and upon receipt of this signal the wait state is released and FIFO counter is updated. Furthermore, each processor core sends out inter-core interrupt signal fint to the other processing core that is associated upon completion of access to FIFO1 by its own processing. Such that, by using FIFO counter and a value of ICSR, a processor core can decide whether it need to go to wait state when FIFO1 is full or empty, without any access to FIFO. In addition, releasing from wait state is also decided by inter-core interrupt signal fint without accessing FIFO. Therefore, both the processes that running on upstream core C0 and that running on downstream core C1 can be synchronized through less overhead than a conventional method. In general, the more entries on FIFO1 (in another word larger number of FIFO depth), the less frequently wait state happens. In this embodiment described above, even if the number of entries in FIFO buffer is limited, the upstream core C0 and the downstream core C1 can execute IPCs properly through FIFO buffer with less overhead. Thus, it is clear that the embodiment of the present invention improves efficiency of IPCs in distributed processing. It is also to be noted that, a large number of the entries in the FIFO buffer is preferable when the processing rates of the processes on upstream and downstream cores C0 and C1 are not exactly the same.

1-5-3 Structure of Processor Core with an Output FIFO

In order to realize the above behavior, processor core 100 (FIG. 1) can operate properly with a hardware appropriate for realization of an upstream processor core. Where, FIFO buffer 200 is an output FIFO buffer for the upstream core C0. That is, FIFO buffer 200 receives an element from the upstream core C0 that is another core than the downstream core C1, where the element is to be processed by the downstream core C1 that is either of processor cores within at least two of processor cores 100A and 100B.

To be more specific, a processor core as an upstream core (processor core 100A, for example) is capable of storing a value for output FIFO within its ICSR 110A and FIFO counter 120A. In addition, FIFO counter update function or step implemented in a processor core as an upstream core (processor core 100A, for example) includes a function or a step, in which, upon receipt of inbound inter-core interrupt signal fiint from another processor core, or the downstream core C1 (processor core 100B, for example), a value in FIFO counter for an output FIFO is decremented, and in which, upon sending out outbound inter-core interrupt signal foint to the downstream core C1, the value in FIFO counter is incremented. It is a typical processing manner in a case when the FIFO counter value represents a current number of entries in use.

Furthermore, it is also preferable that inter-core interrupt synchronization function implemented in the upstream core C1 in this embodiment executes following wait control or steps. By comparing a value in the FIFO counter for output FIFO with a value in the ICSR, if output FIFO is full, then the upstream core makes the process in wait state by itself. After that, upon receipt of inbound inter-core interrupt signal fiint from the downstream core, the upstream core resumes execution of the process. In another word, a processor core that executes such a process amongst processor cores 100 is capable of acting as the upstream core C0. As described above, the value in the FIFO counter in upstream core C0 for output FIFO is decremented upon receipt of inbound inter-core interrupt signal fiint. However, releasing wait state immediately after receipt of inbound inter-core interrupt signal fiint without waiting for such decrement may reduce waiting time that might have been required to check and see the value in the counter.

In its program, it is preferable that above-mentioned wait control function is implemented on the upstream core C0, for example processor core 100, by indicating FOWAIT prefix for waiting control on instructions to be executed for only the instruction process that are targeted. This means that the upstream core C0 stops execution of the instruction that follows FOWAIT and goes into wait state when a certain condition is satisfied. This condition is that the number of FIFO entry in use, which is indicated by the FIFO counter value, equals to an upper limit for the number of entries available for output FIFO buffer, where the upper limit is indicated by ICSR. As an example case, let us assume that the number of entries in the output FIFO is 4, and the value of this upper limit, 4, is set in the ICSR. In this case, if the FIFO counter indicates that output FIFO in use is less than 4 entries, even when the above instruction having prefix FOWAIT can be executed immediately without any wait. On the other hand, when the FIFO counter indicates that output FIFO in use is 4, the instruction accompanying the prefix FOWAIT is not executed and the processor core goes into wait state. For this purpose, the upstream processor C0 is implemented so as to decode and execute FOWAIT as a prefix that realize the function described above. For example, hardware design includes a prefix decoder to decode prefix in the decoder of processor core 100, where the decoder controls if an instruction should be issued for the instruction following the prefix in the same program line to the execution stage. As such, since the FIFO status is obtained, the upstream core C0 consumes no cycle for having the output FIFO status, or for stopping/resuming the execution. Usually, the instruction that follows the prefix in the same program line is an instruction that outputs an element to the downstream core C1 by using output FIFO, where the element is obtained as a result by the process execution. Hereinafter, "to follow" in the context of prefix of this embodiment means that the instruction is placed after the prefix, such as the case the prefix precedes the instruction.

As is evident from the above, the prefix FOWAIT introduced above is intended to make a wait point explicit in the processes under process control for the writing process. In the standard or conventional approach, rather complicated operations are necessary. In the conventional example, it is necessary to fix the wait to the attempt to write to the FIFO, and then to make the test if the FIFO buffer is full or not, which is a "test then branch" type of operation. In contrast, the above-mentioned prefix FOWAIT is effective for the execution of the instruction following it. Thus if the test associated with the FOWAIT is executed while the FIFO buffer is full, the processor core will wait for the FIFO buffer to go not full before executing the instruction attached to the prefix FOWAIT. More specific operation in this regard will be described later.

1-5-4 Structure of Processor Core with Input FIFO

As same as the above, processor core 100 (FIG. 1) has appropriate hardware in order for it to act as a downstream core C1, and to operate properly. In this case, FIFO buffer 200 is an input FIFO buffer for the downstream core C1. Such that, FIFO buffer 200 receives an element from the upstream core C0, which is other core than the downstream core C1, as an element to be processed by the downstream core C1, which is one of at least two of processor core 100A and 100B.

More specifically, ICSR in processor core 1000 that works as downstream core C1, and the FIFO counter in the downstream core C1, can store values for the input FIFO buffer. In addition, the FIFO counter update function or step to be implemented in processor core 100 acts as the downstream processor core C1 includes a function or a step, in which, upon receipt of outbound inter-core interrupt signal foint from the upstream core C0, a value in the FIFO counter for an input FIFO buffer is incremented, and in which, upon sending out inbound inter-core interrupt signal fiint to the upstream core C0, the value in the FIFO counter is decremented. Also for the operation of the input FIFO buffer, more specific operation will be described later.

Furthermore, it is preferable that inter-core synchronization function implemented in the downstream core C1 in this embodiment executes following function or step, which is referred to as "execution control function or step." By comparing a value in the FIFO counter for input FIFO with a value indicating that the input FIFO is empty, if input FIFO is indicated as empty, then the downstream core makes its process wait state. After that, upon receipt of outbound inter-core interrupt signal foint from the upstream core C0, the wait state is released and the downstream core resumes process execution. In another word, a processor core that executes such a process amongst processor cores 100 is capable of acting as the downstream core C1. As described above, the value in the FIFO counter for input FIFO buffer in the downstream core C1 is incremented upon receipt of outbound inter-core interrupt signal foint. However, releasing wait state immediately after receiving outbound inter-core interrupt signal foint without waiting for such increment may reduce waiting time that might have been required to check and see the value in the counter.

In this embodiment, the above execution control function implemented in the downstream core C1 such as processor core 100, for example processor core 100B, works for only the instruction process by explicitly adding execution control prefix FISYNC to one of instruction to execute. The downstream core C1 execute the above instruction that added FISYNC prefix only under a certain condition. This condition is that entry number of input FIFO in use that is indicated by FIFO counter is greater than zero. This means that FIFO counter value is compared with a value that indicates that input FIFO is empty. For example, if the FIFO counter indicates that the number of entry in input FIFO in use is greater than zero, the instruction accompanying FISYNC prefix is executed without any additional cycles. On the other hand, if the FIFO counter indicates the number of entry of input FIFO in use is zero, then the instruction added FISYSC prefix goes into wait state. Therefore, the downstream core C1 is implemented so as to decode and execute FISYNC as a prefix instruction to realize the function described above. As same with the implementation of waiting control function, FOWAIT, prefix decoder to decode FISYNC is implemented in processor core 100. As this result, processor core 100 consumes no cycles to acquire input FIFO status, or stop or resume a process by acquiring the state. Typically FISYNC is added to an instruction that read an element from the upstream core C0 through input FIFO.

With respect to the concept of the FOWAIT and FISYNC prefixes in this embodiment may be more easily understood in consideration of the relationship between them. Simply put, the FISYNC instruction prefix introduced above can be considered as the "FIFO reader" counterpart of the FIFO writer's FOWAIT. Namely, more literal, or logical expression of FISYNC in the above may be "FOWAIT." It follows that, the FISYNC prefix causes entry to wait after execution of accompanying instruction if the FIFO is empty. Also, it is to be noted that the FOWAIT and FISYNC prefixes described above differ from the FINT prefix, in that FINT "execution occurs" after the attached instruction is executed, while FOWAIT and FISYNC "execution occurs" before the attached instruction is executed.

1-6 Advantage of Using Prefix

As described above, FINT, FOWAIT, and FISYNC prefix are used for interrupt and synchronization between processor cores. The advantage of using prefix for control is that the program is simple and the processing efficiency is quite high.

1-6-1 Program is Simple

The prefixed described above, such as FINT, FOWAIT, and FISYS, is explicitly indicated in program, in order for the specified function be executed when completing its following instruction or accessing the FIFO buffer. It is rather simple program that does inter-process synchronization, exclusive control, or FIFO access. More specifically, the inter-core interrupt generation function is a function to notify completion of FIFO access. In order for this, the prefix for interrupt generation FINT is added in the line of the instruction that completes the access to an entry in the FIFO buffer. Similarly, inter-core interrupt synchronization function includes a function to check to see the FIFO status when a step of program is required to access FIFO. The FOWAIT or FISYNC is added to an instruction to set certain execution condition in that FIFO should be in appropriate condition, or in another word, the FOWAIT or FISYNC adds an execution condition to following instruction that the FIFO is not full (FOWAIT), or the FIFO is not empty (FISYNC). Especially, since all the instruction in a program can be used for processing "as is" except adding prefixes, the prefixes have a significant advantage by simplifying program or compiler, which generates instruction sequence with prefixes from higher level language. It is not difficult for the compiler to generate the prefixed instructions from a program written in the higher level language.

In a practical point of view, using prefixes shows another significant advantage. When running a program, assuming that the processor core handles prefixes may make it easy to "hide" the processing time for the prefix in the attached instruction's execution time. It is to be noted that this value is greatest for an in-order single-issue processor core, such as is normally found in most embedded systems. In this embodiment of the present invention, both the FISYNC and FOWAIT can effectively be "zero cycle" operations just by having specific signals, updated every cycle for the FIFO full and FIFO empty conditions. This considerably reduces the "cost" of handling IPCs through the FIFO buffer when adjusting the instructions required to write and read the data, which are required in any applications. The synchronization with IPCs becomes effectively cost-free, from a time stand point.

Each of the processor core in this embodiment that has these prefixes as members in its instruction set is designed to decode these prefix and executes the instruction with functions such as inter-core interrupt generation function and inter-core interrupt synchronization function. For example, the decoder unit of the processor core is designed so as to cause the above prefix decoder to stop or resume the instruction issuance, depending on the FIFO counter value, interrupt, and the decoded prefix.

1-6-2 High Efficiency

Another advantage of using above prefix is no extra cycle is required for inter-core interrupt, so that the program including IPCs can be highly efficient. In the program that uses the prefixes, no extra instruction is required to check to see the FIFO condition for inter-process communications, or to change control flow depending on the FIFO condition. Therefore, there are almost no extra overhead cycles to use a FIFO buffer. In addition, even if FOWAIT or FISYNC is indicated for the inter-core interrupt synchronization function, a processor core goes into a wait state only when output FIFO is full or input FIFO is empty, or only when a process cannot be executed. It follows that, when status of FIFO buffer is appropriate to execute a process, even if FIFO is actually used, the performance is as if there is no check on FIFO status.

1-7 Implementation of ICSR

FIG. 4 illustrates a typical structure of ICSR in each processor core in this embodiment. As illustrated in FIG. 4, each ICSR can have appropriate bit length, which is 32-bit in this example. In processor 1000, in the case that eight of FIFOs, such as FIFO0-FIFO2 as illustrated in FIG. 2 are used, typically, 4-bit is assigned for each FIFO buffer. Then, in the ICSR structure as in FIG. 4, lower 3-bit (FIFOn(2:0)) indicates the depth of FIFOn within each 4-bit that corresponds to each FIFO (FIFOn, where n is from 0 up to 7), and the MSB of each 4-bit (Fn) is a direction bit to indicate a direction of FIFOn. Where, FIFO depth equals 1 means that, the FIFO has only one entry. And, it is effective to adopt FIFO depth of 0 to effectively mean that the FIFO is not accessible, or inbound inter-core interrupt signal fiint related to the FIFO is not usable. In addition, said direction indicates whether the FIFO is an input FIFO or an output FIFO for a processor core having the ICSR. The direction is corresponding to the left and right of FIG. 2(a). For example, the 0 and 1 of said direction bit may indicate input FIFO and output FIFO, respectively.

Implementation of the ICSR in each processor core is an example structure as a register to provide required function, as a simple manner. For example, FIGS. 4(b) and 4(c) are the example of ICSR for the upstream core C0 and the downstream core C1, respectively, and it corresponds to FIG. 2. The illustration of ICSR indicates that, 1) the FIFO depth is 2, 3, 4 entries for FIFO0-FIFO2 respectively, 2) the direction of the FIFO for the upstream core C0 and the downstream core C1, or whether the FIFO buffer is an input FIFO or an output FIFO, and 3) the downstream core C1 and the upstream core C0 cannot access FIFO0 and FIFO2, respectively. As such, each FIFO is defined to be used from which processor core by setting an appropriate value in ICSR of each processor core.

1-8 Structure of Inter-Core Interrupt Signal Fint

Next, typical structure of inter-core interrupt signal fint will be described. As illustrated in FIG. 2, typical inter-core interrupt signal fint consists of inbound inter-core interrupt signal fiint and outbound inter-core interrupt signal foint. In addition, by postfix of FIFO in FIG. 2, for example correspondence between FOINT1 and FIFO1 is clearly indicated, and this also applies to inbound inter-core interrupt signal fiint and outbound inter-core interrupt signal foint for denoting the signal with corresponding FIFO.

Figure 5:
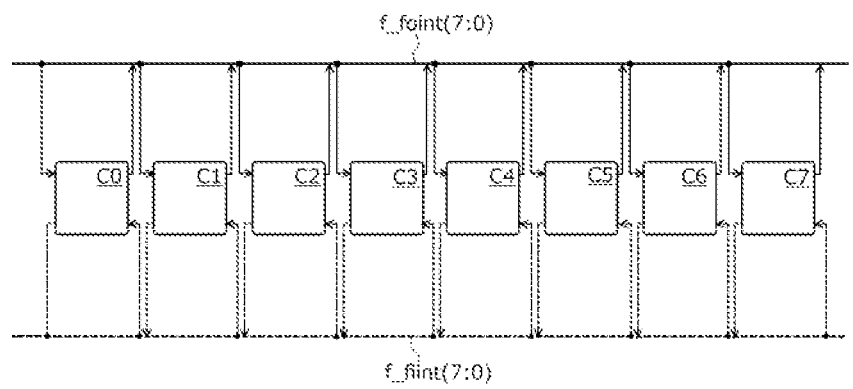
FIG. 5 is a diagram showing a specific structure of signal path to transfer inter-core interrupt signal fint in a processor in an embodiment of the present invention.

FIG. 5 illustrates specific structure of signal path to transfer inter-core interrupt signal fint. In this embodiment, this signal path is called "f bus." Here, f bus includes multiple channels that can be at least logically distinct from each other. In FIG. 5, each signal paths, indicated as f_fiint(7:0) transfers inbound inter-core interrupt signal fiint, and f_foint(7:0) transfers outbound inter-core interrupt signal foint, respectively. Especially, if it is described in terms of the example illustrated in FIG. 4, inbound inter-core interrupt signal fiint has an independent bit corresponding to each FIFOn (n is from 0 up to 7). This is also illustrated as f_fiint(7:0) in FIG. 5. Each route of these signal paths is typically connected to both processor core 100A and processor core 100B that is described as at least two processor cores of processor core 100. In FIG. 5, eight processor cores from C0 to C7 are illustrated corresponding to the ICSR structure in FIG. 4. Therefore, a signal path indicated as f_foint(7:0) transfers inbound inter-core interrupt signal fiint that is related to input FIFO for both processor core 100A and processor core 100B. Similarly, f_foint(7:0) transfers outbound inter-core interrupt signal foint that is related to output FIFO for both processor core 100A and processor core 100B.

Here, an instruction that controls issuance of inter-core interrupt signal fint and outbound inter-core interrupt signal foint, or FINT prefix instruction, determines which bit of inter-core interrupt signal fint and outbound inter-core interrupt signal foint to be sent, by merely identifying a target FIFO. This is because, when FINT prefix is executed, a prefix decoder for example within each processor core can identify by referencing said direction bit Fn (ICSR in FIG. 4(*a*)) that the FIFO is input FIFO or output FIFO the processor core. For example, If a direction bit Fn in FIFOn (n is one of number from 0 to 7) indicates that the FIFOn is input FIFO for the processor core, inter-core interrupt signal fint is issued through the number n signal in f_fiint(7:0). Then, the inter-core interrupt signal fint is used for control in a processor core that uses the FIFOn as an output FIFO as described above. It is same for the case where the direction is vice versa.

A typical structure that uses channels with direction, in this embodiment provides flexibility to capable of any combination to carry over a sequence of instruction execution process using FIFO amongst more than three processor cores in a processor. Especially, in case that FIFO is implemented by using a memory on a same chip or off the chip, the flexibility to be able to access from each processor to FIFO increase a freedom on processing over multi-cores drastically. For example, in FIG. 5 it is possible to use FIFO as processor core C7 to be an upstream core, and processor core C0 to be a downstream core. In order to avoid racing condition, in a most typical case, each FIFO is connected to one of downstream cores from one of upstream cores, in principle.

It is noteworthy that the FINT prefix has now been expanded to FINTn where "n" is the target FIFO number, so that the system can infer the FINT direction from who the issuer is.

1-9 Dynamic Adjustment of the Number of FIFO Entries

A structure that allow dynamic adjustment of the numbers of entries in two FIFO buffers will be described using FIGS. 1 and 2. FIFO buffer 200 includes 3rd processor core 100C in addition to processor cores 100A and 100B in multiple processor cores in processor 100. There is a case in that multiple FIFO buffers that are logically distinct with each other are used, such as FIFO1 and FIFO2 in FIG. 2. The 3rd processor core 100C has ICSR 110C and FIFO counter 120C, and is implemented to be able to process inter-core interrupt synchronization function, inter-core interrupt generation function, and FIFO counter update function. In this case, the 1st ICSR that is an ICSR in either processor core within the 1st pair of processor cores that is included in processor cores 100A, 100B, and 100C, has a value for FIFO1 (1st FIFO) for IPCs between the 1st pair of processor cores. Regarding FIFO2 (2nd FIFO), ICSR that is an ICSR in either processor core within the 2nd pair of processor cores included in processor cores 100A, 100B, and 100C, is being a 2nd ICSR, Where, one of processor core within the 1st pair of processor cores, and one of processor core within the 2nd pair of processor cores can be the same processor core. In FIG. 1, for example, the 1st pair consists of processor cores 100A and 100B, and the 2nd pair can be processor cores 100B and 100C.

As described above, structure with more number of entries for FIFO1 and FIFO2 is theoretically ideal because such structure gives higher performance for a distributed processing, thus the FIFO buffers act as a reducer of inter-core load imbalance. However, the FIFO1 and FIFO2 buffers are implemented on a shared memory, for example on-chip memory used to implement these FIFO, both FIFO1 and FIFO2 should share a memory resource. In addition, there is a case in which imbalance is significant among loads in processor cores. Moreover, the usage of entries in FIFO1 and FIFO2 can change dynamically. In order to address this, it is effective to change the number of FIFO entries of both FIFO1 and FIFO2 dynamically.

FIFO buffers in this embodiment can be located in shared memory of no dedicated hardware or in dedicated memory. In this embodiment, the FIFO sizes are capable of being dynamically changed that causes trade-off among them, even within an executing process, not just on a process boundary.

The condition is determined by load balance of processor cores to use each FIFO. The condition can be observed as a status of each FIFO, by for example, FIFO1 is full, FIFO2 is empty, or something with these combinations. In this embodiment processor 1000, in order to adjust the balance, an input FIFO (for example, FIFO1) for a processor core (for example, the downstream processor core C1). Specifically, when the core has more workload than a processor core upstream from it (for example, the upstream processor core C0), the number of entries of input FIFO (FIFO1) is increased. When the core has less workload than upstream processor core, the number of entries of input FIFO (FIFO1) is decreased, and the number of entries of output FIFO is increased. If the workload has opposite balance, the balance of the number of entries of FIFO buffers is oppositely sifted. In addition, in order to adjust the balance, for example, if FIFO1 becomes full frequently then the entry of FIFO1 is increased, and if FIFO2 becomes empty frequently then the entry of FIFO2 is decreased. In the embodiment processor 1000, since upper limit of each FIFO depth is defined in ICSR 110, the adjustment of FIFO entries for FIFO1 and FIFO2 is done by changing the value of 1st ICSR and 2nd ICSR. The timing of adjustment is pre-indicated in program depending of the characteristics of the process to execute. Another method is adjustment based on monitoring of dynamic workload. For example, by another processor core for management such as management core 170 than the processor cores for processing, workload of the upstream core C0, the downstream processor C1, even additional processor core can be monitored. In addition, it is effective that management core 170 can monitor the FIFO counter that is compared between the 1st ICSR and 2 ns ICSR, or it can even monitor inter-core interrupt signal fint. Thus, workload balancing by dynamic adjustment of entries in FIFO is practical to increase computation performance with utilizing limited memory resources for computation.

2. FIFO Implementation Example

Next, example FIFO implementation is described. Hardware for FIFO to execute carry over shown in FIG. 3 through flow chart illustrated in FIG. 2, may be implemented as two typical structures. One is to use memory, and another is to use a register bank shared between processor cores. Each structure will be described based on sample programs. Note that, in following explanation, the difference between a memory or a shared register bank is only on FIFO1, and the other FIFO such as FIFO0 and FIFO2 is organized as a memory for both cases.

2-1 FIFO Implementation on Memory

Implementing FIFO using RAM, or random access memory, in this embodiment includes two typical cases, in which memory resides on another semiconductor chip than that of a processor, and the other in which memory resides on the same chip. In both cases accessing FIFO is done through addressing.

2-1-1 Example Program

FIG. 6 is an example set of program lists of sample codes when all FIFO buffers of FIFO buffer 200 is implemented on memory. Where, the program is described as a program to be executed on the upstream core C0 and the downstream core C1 as illustrated in FIG. 2. As shown in FIG. 6, each of the upstream core C0 and the downstream core C1 is given a program for respective process. In short, a sequence of instruction execution process is carried out partly by upstream core C0 as process P0 and partly by downstream core C1 as process P1. In these program lists, the string following ";" in a line is a comment, and descriptions between "<" and ">" are indicated to show the behavior of program there in place of the actual program lines. Furthermore, the flow chart described referring the FIG. 3 corresponds to the process P0 runs on the upstream processor C0, stream-out, stream-in and process P1 runs on the downstream core C1.

2-1-1-1 Program Runs on the Upstream Core C0

The processes executed by the upstream core are initialization, stream-in through input FIFO0 on memory, kernel of P0, and stream-out to output FIFO1. In initialization, the base addresses for FIFO0 as an input FIFO for the upstream core C0 and for FIFO1 as an output FIFO for the upstream core C0, are set. Then the values in ICSR that corresponds to FIFO0 and FIFO1 are set to appropriate values.

The first instruction for stream-in is FISYNC0:FINT0: LDM D0x16, [R0]. This instruction has two prefixes, FISYNC0 and FINT0, as well as an instruction LDM (Load Multiple Data). Note that the LDM instruction uses R0 register as an address pointer to indicate data that is loaded into 16 registers started with D0 register. The FISYNC0 is an execution control prefix related to FIFO0, which controls the execution of instruction that follows it, in this case LDM instruction as described in "1-5-4 Organization of processor core uses input FIFO." Specifically, the effect of FISYNC0 may be described in two cases. One case is that when FIFO0 (FIG. 2) is ready, which means the FIFO buffer is not empty, then it controls execution of the LDM instruction following it. The other case is that when FIFO0 is empty then it controls wait execution of LDM instruction. Here, two conditions in these two cases are referred to as 1st and 2nd conditions respectively. The FOINT0 corresponds to outbound inter-core interrupt signal foint from a processor core upstream of the upstream core, if such a processor core exists. The 2nd condition is cleared upon receipt of the inbound inter-core interrupt signal fiint, and the 1st and the 2nd conditions are mutually exclusive. Therefore, the function of FYSINC0 illustrated in the two cases above is substantially identical to the execution control function mentioned above.

On the other hand FINT0 is a prefix to generate inter-core interrupt signal fint to the upstream processor core by inbound inter-core interrupt signal fiint (FIINT0, FIG. 2), upon completion of its following instruction, in this case LDM instruction. The last character or "0" on FINT0 prefix denotes that the prefix is for FIFO0. It is to be noted that whether FIFO0 corresponds to input FIFO or output FIFO for the upstream core C0 is not indicated by the FINT0. This is because upstream core C0 can determine by referencing direction bit in ICSR as to whether each FIFO is input FIFO or output FIFO.

Whether FIFO0 is empty or not is determined by the value (FIFO0.CNT) of FIFO counter for FIFO0. In order to enable this, FIFO0.CNT is to be decremented upon sending out inbound inter-core interrupt signal fiint to the upstream core, and to be incremented upon receipt of outbound inter-core interrupt signal foint from the upstream core, as a FIFO counter update function.

Furthermore, as a second instruction for stream-in, by ADD instruction, R0 (a register for address pointer of FIFO0) is shifted by the size of one entry in FIFO0, or FIFO0_size. With this pointer update, stream-in is completed.

Stream-in is followed by execution of a kernel process, process P0 (FIGS. 2 and 3)

Stream-out is a process to send data within data register in upstream core C0 to the downstream core C1 through FIFO1 (FIG. 2). This process is executed in accordance with an instruction FOWAIT1:FINT1:STM [R1], D16x16. This instruction has two prefixes FOWAIT and FINT0, as well as an instruction STM (Store Multiple Data). The STM instruction stores data stored in 16 registers starting at D16 to memory area where its address is indicated by R0 register.

FOWAIT1 in the stream-out is a wait control prefix for FIFO1, and the wait control function effects its following instruction, in this case STM instruction. The effect of FOWAIT1 is also described in two cases. One case is that when FIFO1 (FIG. 2) is full, it controls to wait execution of STM instruction. Then the processor core waits for inbound inter-core interrupt signal fiint from the downstream processor core. The other case is that when FIFO1 is not full, it controls to execute STM instruction. Here again, two conditions in these two cases are referred to as 1st and 2nd conditions respectively, and also the 1st and the 2nd conditions are mutually exclusive. That is, FIFO1 will be not full upon receipt of the inbound inter-core interrupt signal fiint, thus the effect of the FOWAIT1 in the above two cases is substantially identical to the wait control function stated above.

FINT1 is a prefix to generate interrupt upon completion of its following instruction, in this case STM instruction. So, upon completion of access to FIFO1 by STM instruction, the processor core issues an outbound inter-core interrupt signal foint (FIG. 2) to the downstream core C1. The last character "1" of FINT1 prefix denotes that it is for FIFO1. The reason why the direction of FIFO1 is not specified in the prefix itself is the same as FISYNC0. The FIFO counter of FIFO1 (FIFO1.CNT) is also used. In addition, similarly as described in the above, FIFO1.CNT is decremented upon an issuance of outbound inter-core interrupt signal foint to the downstream process core and incremented upon a reception of an inbound inter-core interrupt signal fiint, or FIFO counter update function.

2-1-1-2 Program on Downstream Core C1

The program executed on the downstream cores for carry over is similar to the program for the upstream core, which consists of initialization, stream-in, process P1 as kernel, and stream-out. However, stream-in and stream-out do not require anything if the results of process execution is well aligned on a shared register bank. Effect of each prefix is same as the explanation above. Thus, the difference between the programs for the upstream core and the one for the downstream core is the FIFO to be used. In addition, process P1 is a final line of a sequence of executed instructions, a prefix with respect to the FIFO buffer in the last line, FOWIT2, FINT2, STM [R2], D7x16, is not needed.

2-2 FIFO Implementation on a Shared Register Bank

Another typical embodiment of FIFO implementation is to use a register bank that is shared between processor cores. The access to each register within such a shared register bank does not require cycles for memory access, such as cycles consumed by LDM or S™ instruction, therefore the access can be carried out without any delay, that might have been caused by stream-in or stream-out. This leads to significant advantages for high performance computing. It is to be noted that in order to implement such a shared register bank in this embodiment, each entry of FIFO buffer 200 should be implemented in the shared register bank. In particular, when a FIFO buffer is implemented on such a shared register bank, it can switch a bank for accessing each entry on the FIFO buffer. As a result of such a simple and quick operation and with a freedom from memory wall, this implementation leads to quite highly efficient distributed processing through the FIFO buffer.

Also in this implementation, processor 1000 has processor cores that share at least one register bank among processor cores, where each processor core is designed to have an instruction or prefix to switch register bank. In addition, processor cores that share a register bank may have different structure of themselves. For example, the processor cores of different bit length for registers can share a register bank, by, for example, aliasing register numbers so as to share a same amount of data.

2-2-1 Ring Type Connection

FIG. 7 illustrates a typical implementation of structure using shared register banks for FIFO. FIG. 7(*a*) illustrates how a shared register bank is referred from processor cores next each other, and FIG. 7(*b*) illustrates how shared register banks are referred from the processor core itself and from the next processor core. With this structure, processor cores adjacent each other can refer registers in the shared register bank from each processor core.

Multiple processor cores in this embodiment may include at least three processor cores, which consist of one processor core in addition to the at least two processor cores. The additional processor core, or the at least one processor core, has ICSR and FIFO counter and is implemented so as to execute inter-core interrupt synchronization function, inter-core interrupt generation function, and FIFO counter update function. Moreover, as illustrated in FIG. 7(*a*), at least three processor cores connected together have a ring topology that connects processor cores in order of a ring. The order is kept even in physical layout of processor cores typically in a loop topology on a semiconductor die.

Furthermore, the shared register bank is able to be referred from each processor core in a pair of two processor cores that are adjacent in the connection order. In addition, a pair of adjacent processor cores share a part of the register banks between them. For example, as found in FIG. 7(*b*), we assume that the center processor core in three processor cores in the ring order, or a referring core, uses register banks B0-B15 for its execution. Here, register banks B2-B15 in the referring core are mapped to register banks B4-B7 in a processor core in the left of FIG. 7(*b*), or 1st referred core. Likewise, register banks B8-B11 in the referring core are mapped to register banks B8-B11 in a processor core in the right, or 2nd referred core. As a result, when the 1st referred core keeps executing its operation with FIFO buffers on its register banks B4-B7, the referring core is allowed to access the register banks B4-B7 of the 1st referred core just by accessing the register banks B2-B15 on the referring core.

2-2-2 Example Program

FIG. 8 is an example set of program lists to implement FIFO buffer 200 on a shared register bank. It is described that each program is executed on the upstream core C0 and the downstream core C1, respectively, as shown in FIG. 8. Similar to the case that FIFO is implemented on memory, flow chart in FIG. 3 corresponds to the process P0 runs on the upstream processor core, stream-out, stream-in and Process P1 runs on the downstream core C1. Note that in the following description of the program, only FIFO1 is implemented on a shared register, and the rest, FIFO0 and FIFO2 are implemented on memory. In addition, the following description will concern mainly on the difference of implementation from the case of memory only is utilized as described in the above, and the process with the shared register bank here has different step order from one in the sequence of instructions in FIG. 3, and has different scopes of stream-in and stream-out of such sequence.

2-2-2-1 Program on Upstream Core C0

The processes executed on the upstream core C0 are, initialization that uses FIFO0 on memory as an input FIFO buffer, stream-in, process P0 as kernel, and stream-out that uses FIFO1 in shared register bank as an output FIFO buffer. Initialization is to set base address for FIFO0 that acts as the input FIFO buffer and is located on memory, and setting values in ICSRs for FIFO0 and FIFO1.

The stream-in is same as FIG. 6 since it is implemented on memory. That is, the first instruction is a line, FISYNC0: FINT0:LDM D0z16, [R0]. In the second instruction of the stream-in, ADD instruction shifts by the size of one entry in FIFO0. With this pointer update, stream-in is completed.

After stream-in, kernel process P0 is executed on the upstream core (FIGS. 2 and 3). So, before writing our a result from execution of process P0, a shared-register bank is blocked by the instruction; FOWAIT1:xx. Where, adding FOWAIT1 prefix before its following instruction, the execution of it enables to check and see if FIFO1 is not full. If FIFO1 is not full its following instruction xx is executed. In order to check to see if FIFO1 is full or not, the value in FIFO counter (FIFO1.CNT) will be used.

BS10 is a prefix to switch source bank to B0 and destination bank to B1. By this prefix, a shared-register bank to be used for FIFO1 can be switch to B1, without changing the register bank for source register, or the source bank B0. The characters "10" denote such a combination of the shared registers. With the prefix, entries of FIFO1 buffer, which acts as output FIFO buffer, is designated as the store of the element of the execution. Thereafter, substantive part of process P0, which is expressed as " . . . " in the program list, will be executed. With such processing, execution results will be stored in each register of a destination bank that is designated at B1.

The line starting FINT1: is an instruction to issue an outbound inter-core interrupt signal foint to the downstream core C1, and increment FIFO1.CNT. The process P0 is completed with this instruction.

Stream-out is completed by a process to change the destination bank to B2 in the line starting BS20, to change the storing entries to ones in FIFO1.

In this program, the wait control function is operated through the kernel process, process P0, and stream-out. Since the FIFO1 resides on the shared register bank, values in the ICSR for FIFO1 buffer are not used. The direction of the register bank for the FIFO, such as whether it is the input FIFO or the output FIFO, is not specified by the direction bit in the ICSR, but by the BS10 instruction itself.

2-2-2-2 Program on Downstream Core C1

The processes executed on the downstream core C1 are also, initialization, stream-in, process P1 as a kernel, and stream-out. Here the stream-in is carried out with FIFO1 as the input FIFO buffer, and the stream-out is carried out with FIFO2 as the output FIFO buffer on a memory.

Stream-in corresponds to an instruction of FISYNC1:xx. That is, so long as the register bank of FIFO1 is not ready, or empty, FOINT1 (FIG. 2) is carried out, by waiting for an outbound inter-core interrupt signal foint from the upstream core C0, and upon receipt of the signal foint, instruction xx will be executed. In so doing, a value in the FIFO counter (FIFO1.CNT) is used for determining whether the FIFO1 is empty or not.

More specifically, for the stream-in, FISYNC1 prefix is added to a first instruction of the kernel. Thus, before starting the execution of next kernel process P1, it makes sure an input element form the upstream core is available. This is done by FISYNC for determining FIFO1 that implemented as a register bank is empty, then the processor core stop execution of its following instruction. However, if FIFO1 has any entry the processor core execute its following instruction immediately.

Process P1 sets by BS01 instruction its source bank for the processing to register bank B1, which is a bank of shared register bank, without changing its destination bank. The registers in the bank B1 are used for used in the processing as source registers. Thereafter, in FINT1:xx, when access to the source bank B1 for the instruction xx is completed, an inbound inter-core interrupt signal fiint is sent, and FIFO-.CNT is decremented. By executing the instructions in stream-in and process P1 to this point, the execution control function is practiced. Also in so doing, since FIFO1 is implemented on the shared register bank, values for FIFO1 in values in the ICSR is not used, the direction of the register bank as a FIFO buffer, that is whether the input FIFO or output FIFO, is specified by the direction bit in the ICSR, but by the BS01 instruction itself.

More specifically, FOINT1 prefix is added to the last instruction that requires to refer data of an element sent from the upstream core through FIFO1. Here, upon completion of the last instruction that required to reference input FIFO1, inbound inter-core interrupt signal fiint is sent out and the FIFO counter for FIFO1 is decremented.

After completion of kernel process, stream-out process is carried out, in which FIFO2 located on a memory, such as a RAM, is used as the output FIFO buffer. The stream-out process is carried out in a manner similar to that with a memory.

3 Variations of the Embodiment

In the above description, the embodiment has been described based on elements, function, and operation of a processor. However, the present invention may also be implemented in different embodiments, such as a processor core in a processor that embodies such elements, function, and operation as described above. In addition, the present invention can be implemented as an operation method for such a processor that also embodies each behavior or act of such a processor.

3-1 Variation of FIFO Structure

For example, in the program shown here, FIFO buffer with three entries are illustrated. However, the number of entries is not limited and may be from 1 up to any number. Since the multiple processor cores for the embodiment processor has function to generate inter-core interrupt signal fint, IPCs can be implemented on it by software very efficiently.

3-2 Another Variation of FIFO Structure

Furthermore, the value of ICSR is described as being set during initialization in the sample program. However, as another example of this embodiment, the value of ICSR, or more specifically a value for specifying the number of entries in the FIFO buffer, may be changed for dynamically adjusting the numbers of entries between two FIFO buffers that are used on at least three processor cores. Such an example makes it possible to have better load balance between processes. With such dynamic adjustment, it is possible to design a processor that is practically valuable for its better performance even for the limited resources, such as resources in a memory.

In the above description, the embodiment of the present invention has been described specifically. Any description in this Specification is for the purpose of explaining the present invention, therefore the scope of the invention should be determined based on recitations of the claims. Furthermore, other variation based on any combination of the embodiment is included in the present invention, which variation should be also within a scope of the present invention.

INDUSTRIAL APPLICABILITY

The processor, processor core, and the method of operation described in this Specification can be applied for any electric devices or appliances that use a processor.

DESCRIPTION OF SYMBOLS

| | |
|---|---|
| 1 | computer |
| 2000 | CPU (Central Processing Unit) |
| 3000 | bus |
| 1000 | processor |
| 100 | processor core |
| 100A, 100B, and 100C | processor core |
| 110, 110A, 110B, and 110C | ICSR |
| 120, 120A, 120B, and 120C | FIFO Counter |
| 140 | signal path |
| 170 | processor core for control |
| 200 | FIFO (First-In First-Out) buffer |
| 202 | 1st entry |
| 204 | 2nd entry |
| 206 | 3rd entry |
| 208 | 4th entry |
| C1 | upstream processor core (upstream core) |
| C2 | downstream processor core (downstream core) |
| P0 and P1 | process |
| B0-B15 | register bank |

What is claimed is:

1. A processor comprising:

a plurality of processor cores for processing a sequence of instruction-execution processes, the sequence including inter-process communications (IPCs), and a signal path that is connected to at least two processor cores of the plurality of processor cores and is able to communicate an inter-core interrupt signal fint, wherein every processor core of the at least two processor cores has an inter-core interrupt count setting register (ICSR) for storing a FIFO depth value, wherein the FIFO depth value indicates a number of entries in a first-in first-out (FIFO) buffer that is used for IPCs between a process in a present processor core and a process in a different processor core and sets an upper limit for a range in the instruction-execution sequence, the range including the IPCs under execution, and a FIFO counter for storing a value for indicating a number of entries currently used in the FIFO buffer, and wherein, to every processor core of the at least two processor cores implemented in a operable manner are inter-core interrupt synchronization function that carries out IPCs between a present processor core and a different processor core, based on at least any of: an inter-core interrupt signal fint received from the different processor core of the at least two processor cores, a value in the FIFO counter, and a value in the ICSR, inter-core interrupt generation function that issues and sends an inter-core interrupt signal fint when the present processor core completes accessing the FIFO buffer, the inter-core interrupt signal fint being to be used by the different processor core for controlling its processes, and FIFO counter updating function that increments or decrements a value in the FIFO counter in accordance with a reception of the inter-core interrupt signal fint or with an issuance of an inter-core interrupt signal fint by the present processor core, whereby the processor synchronizes processes on the at least two processor cores for executing the instruction-execution sequence including the IPCs via the FIFO buffer.

2. The processor as set forth in claim 1,
wherein the at least two processor cores are assigned as an upstream processor core and a downstream processor core,
wherein the FIFO buffer is an output FIFO buffer for the upstream processor core, the output FIFO buffer receives elements from the upstream processor core as elements to be processed by the downstream processor core,
wherein the ICSR and the FIFO counter, both in the upstream processor core, are configured to store a value for the output FIFO buffer,
wherein the FIFO counter updating function implemented in the upstream processor core has function, in which the value in the FIFO counter for the output FIFO buffer is decremented when an inbound inter-core interrupt signal fiint is received from the downstream processor core and is incremented when an outbound inter-core interrupt signal foint is issued toward the downstream processor core.

3. The processor as set forth in claim 2,
wherein the inter-core interrupt synchronization function implemented in the upstream processor core has wait control function,
wherein the wait control function
compares the value in the FIFO counter for the output FIFO buffer with the value in the ICSR,
set waiting to a process in the upstream processor core when the output FIFO buffer is indicated as full, and
release from waiting to restart the process in the upstream processor core when the upstream processor core receives an inbound inter-core interrupt signal fiint from the downstream processor core.

4. The processor as set forth in claim 3,
wherein the wait control function is applied on an instruction to be executed, by prefixing a wait control prefix FOWAIT to the instruction.

5. The processor as set forth in claim 1,
wherein the at least two processor cores are assigned as an upstream processor core and a downstream processor core,
wherein the FIFO buffer is an input FIFO buffer for the downstream processor core, the input FIFO buffer receives elements from the upstream processor core as elements to be processed by the downstream processor core,
wherein the ICSR and the FIFO counter, both in the downstream processor core, are configured to store a value for the input FIFO buffer,
wherein the FIFO counter updating function implemented in the downstream processor core has function, in which the value in the FIFO counter for the input FIFO buffer is incremented when an outbound inter-core interrupt signal foint is received from the upstream processor core and is decremented when an inbound inter-core interrupt signal fiint is issued toward the upstream processor core.

6. The processor as set forth in claim 5,
wherein the inter-core interrupt synchronization function implemented in the downstream processor core has execution control function,
wherein the execution control function
compares the value in the FIFO counter for the input FIFO buffer with a value that indicates vacancy of the input FIFO buffer,
set waiting to a process in the downstream processor core when the input FIFO buffer is indicated as vacant, and
release from waiting to restart the process in the downstream processor core when the downstream processor core receives an outbound inter-core interrupt signal foint from the upstream processor core.

7. The processor as set forth in claim 6,
wherein the execution control function is applied on an instruction to be executed, by prefixing an execution control prefix FISYNC to the instruction.

8. The processor as set forth in claim 1,
wherein the inter-core interrupt generation function is executed when access to the FIFO buffer for an instruction to be executed is completed, by prefixing an interrupt generation prefix FINT to the instruction.

9. The processor as set forth in claim 1,
wherein the plurality of processor cores has at least three processor cores that comprise at least one processor core in addition to the at least two processor cores,
wherein the at least one processor core has the ICSR and the FIFO counter, and
wherein, to the at least one processor core is implemented in a operable manner are the inter-core interrupt synchronization function, the inter-core interrupt generation function, and the FIFO counter updating function,
wherein the at least three processor cores have a first processor core pair and a second processor core pair,
wherein a first ICSR includes a value that is used for IPCs between processes in the first processor core pair,
wherein a second ICSR includes a value that is used for IPCs between processes in the second processor core pair, and
wherein a number of entries in the first FIFO buffer is increased by changing a value in the first ICSR, and a number of entries in the second FIFO buffer is decreased by changing a value in the second ICSR.

10. The processor as set forth in claim 1,
wherein the ICSR in respective processor cores has a direction bit for a FIFO buffer that is accessible by the processor core,
wherein the direction bit indicates, in association with the FIFO depth value, whether the FIFO buffer is an input FIFO buffer or an output FIFO buffer for the processor core.

11. The processor as set forth in claim 2,
wherein the plurality of processor cores has at least three processor cores that comprise at least one processor core in addition to the at least two processor cores,
wherein the at least one processor core has the ICSR and the FIFO counter, and
wherein, to the at least one processor core is implemented in an operable manner are the inter-core interrupt synchronization function, the inter-core interrupt generation function, and the FIFO counter updating function,
wherein the signal path has a plurality of channels in the signal path, wherein each channel is connected to every processor core of the at least three processor cores, wherein one channel in the signal path communicates an inbound inter-core interrupt signal fiint for an input FIFO buffer on every processor core of the at least three processor cores, wherein another channel in the signal path communicates an outbound inter-core interrupt signal foint for an output FIFO buffer on every processor core of the at least three processor cores.

12. The processor as set forth in claim 1, wherein the FIFO buffer is implemented on a memory device in a semiconductor chip separate from a semiconductor chip having the processor, or the FIFO buffer is implemented on an on-chip memory device in a semiconductor chip having the processor.

13. The processor as set forth in claim 1, further comprising a shared register bank that is accessible from the at least two processor cores, wherein each entry for the FIFO buffer is implemented on each bank of the shared register bank.

14. The processor as set forth in claim 13, wherein the plurality of processor cores has at least three processor cores that comprise at least one processor core in addition to the at least two processor cores, wherein the at least one processor core has the ICSR and the FIFO counter, wherein, to the at least one processor core is implemented in a operable manner are the inter-core interrupt synchronization function, the inter-core interrupt generation function, and the FIFO counter updating function, wherein the at least three processor cores form a ring connection, in which respective processor cores are arranged in order, and wherein the shared register bank is referable from one processor core to the other processor core in a pair of processor cores in at least one direction of ascending and descending orders in the order, the pair of processor cores neighboring with each other in the order.

15. The processor as set forth in claim 14, wherein the shared register banks of processor cores in a pair of processor cores are referable each other, the pair of processor cores neighboring with each other in the order of the processor cores in the ring connection.

16. A processor core for a processor, the processor having a plurality of processor cores for processing a sequence of instruction-execution processes, the sequence including inter-process communications (IPCs), the processor core for the processor being one of at least two processor cores in the plurality of processor cores, and the at least two processor cores being interconnected to a signal path that is able to communicate an inter-core interrupt signal fint, wherein every processor core of the at least two processor cores has an inter-core interrupt count setting register (ICSR) for storing a FIFO depth value, wherein the FIFO depth value indicates a number of entries in a first-in first-out (FIFO) buffer that is used for IPCs between a process in a present processor core and a process in a different processor core and sets an upper limit for a range in the instruction-execution sequence, the range including the IPCs under execution, and a FIFO counter for storing a value for indicating a number of entries currently used in the FIFO buffer, and wherein, to every processor core of the at least two processor cores implemented in an operable manner is inter-core interrupt synchronization function that carries out IPCs between a present processor core and a different processor core, based on at least any of: an inter-core interrupt signal fint received from the different processor core of the at least two processor cores, a value in the FIFO counter, and a value in the ICSR, inter-core interrupt generation function that issues and sends an inter-core interrupt signal fint when the present processor core completes accessing the FIFO buffer, the inter-core interrupt signal fint being used by the different processor core for controlling its processes, and FIFO counter updating function that increments or decrements a value in the FIFO counter in accordance with a reception of the inter-core interrupt signal fint or with an issuance of an inter-core interrupt signal fint by the present processor core, whereby the processor synchronizes processes on the at least two processor cores for executing the instruction execution sequence including the IPCs via the FIFO buffer.

17. A method for operating a processor having a plurality of processor cores for executing a sequence of instruction-execution processes including inter-process communications (IPCs), wherein every processor core of at least two processor cores in the plurality of processor cores has a FIFO counter for storing a value for indicating a number of entries currently used in a first-in first-out (FIFO) buffer that is used for IPCs between a process in a present processor core and a process in a different processor core, and an inter-core interrupt count setting register (ICSR) for storing a FIFO depth value, and every processor core of at least two processor cores is interconnected to a signal path that is able to communicate an inter-core interrupt signal fint, wherein the FIFO depth value indicates a number of entries in the FIFO buffer and sets an upper limit for a range in the instruction-execution sequence, the range including the IPCs under execution, comprising steps, by functional means implemented in every processor core of the at least two processor cores, of:

inter-core interrupt synchronization step for carrying out IPCs between a present processor core and a different processor core in the at least two processor cores based on at least any of: inter-core interrupt signal fint received from the different processor core, a value in the FIFO counter, and a value in the ICSR, inter-core interrupt generation step for issuing and sending an inter-core interrupt signal fint when the present processor core completes accessing the FIFO buffer, the inter-core interrupt signal fint being used by the different processor core for controlling its processes, and FIFO counter updating step for incrementing or decrementing a value in the FIFO counter in accordance with a reception of the inter-core interrupt signal fint or with an issuance of an inter-core interrupt signal fint by the present processor core, whereby the instruction-execution sequence including the IPCs via the FIFO buffer is executed with synchronization of processes on the at least two processor cores.

18. The processor as set forth in claim 5, wherein the plurality of processor cores has at least three processor cores that comprise at least one processor core in addition to the at least two processor cores, wherein the at least one processor core has the ICSR and the FIFO counter, and wherein, to the at least one processor core is implemented in an operable manner are the inter-core interrupt synchronization function, the inter-core interrupt generation function, and the FIFO counter updating function, wherein the signal path has a plurality of channels in the signal path, wherein each channel is connected to every processor core of the at least three processor cores, wherein one channel in the signal path communicates an inbound inter-core interrupt signal fint for an input FIFO buffer on every processor core of the at least three processor cores, wherein another channel in the signal path communicates an outbound inter-core interrupt signal foint for an output FIFO buffer on every processor core of the at least three processor cores.

\* \* \* \* \*